US011642596B2

(12) United States Patent
Atli et al.

(10) Patent No.: US 11,642,596 B2
(45) Date of Patent: May 9, 2023

(54) GAME MEDIATION INFRASTRUCTURE FOR ESTABLISHMENT OF MULTIPLAYER GAMING SESSIONS

(71) Applicant: Bunch Live, Inc., San Francisco, CA (US)

(72) Inventors: Selcuk Atli, San Francisco, CA (US); Jason Liang, Toronto (CA); Jordan Howlett, Toronto (CA)

(73) Assignee: BUNCH LIVE, INC., New York, NY (US)

( * ) Notice: Subject to any disclaimer, the term of this patent is extended or adjusted under 35 U.S.C. 154(b) by 46 days.

(21) Appl. No.: 16/841,501

(22) Filed: Apr. 6, 2020

(65) Prior Publication Data
US 2020/0338456 A1   Oct. 29, 2020

Related U.S. Application Data

(60) Provisional application No. 62/840,311, filed on Apr. 29, 2019.

(51) Int. Cl.
*A63F 13/79* (2014.01)
*A63F 13/35* (2014.01)

(52) U.S. Cl.
CPC ............. *A63F 13/79* (2014.09); *A63F 13/35* (2014.09)

(58) Field of Classification Search
CPC ........ A63F 13/79; A63F 13/795; A63F 13/73; A63F 13/77; A63F 13/35; A63F 13/48; A63F 13/87; A63F 13/352
USPC ......................................................... 463/42
See application file for complete search history.

(56) References Cited

U.S. PATENT DOCUMENTS

| | | | |
|---|---|---|---|
| 2007/0078000 A1* | 4/2007 | Saund .................... | A63F 13/352 463/42 |
| 2009/0006604 A1 | 1/2009 | Dhupelia et al. | |
| 2009/0291761 A1* | 11/2009 | Hata ...................... | A63F 13/822 463/42 |
| 2009/0318224 A1* | 12/2009 | Ealey ..................... | A63F 13/85 463/31 |

(Continued)

FOREIGN PATENT DOCUMENTS

KR   10-2018-0077355 A   7/2018

OTHER PUBLICATIONS

PCT International Search Report and Written Opinion, PCT Application No. PCT/US2020/029184, dated Jul. 30, 2020, 12 pages.

(Continued)

*Primary Examiner* — Michael A Cuff
(74) *Attorney, Agent, or Firm* — Fenwick & West LLP

(57) ABSTRACT

Within a multiplayer gaming environment, a game mediation infrastructure facilitates the creation and use of multiplayer gaming sessions. The game mediation infrastructure allows leveraging the context of an existing gameplay session within a game (e.g., the game being played, the identities of the participants) to begin a corresponding session in a game mediator application. The session in the game mediator application provides functionality—such as game-related communication capabilities—that is superior to that provided by the game itself. These actions by the game mediation infrastructure reduce or eliminate steps that would otherwise have to be performed by users, thereby greatly simplifying user coordination for multiplayer gaming.

23 Claims, 11 Drawing Sheets

(56) References Cited

U.S. PATENT DOCUMENTS

| | | |
|---|---|---|
| 2012/0283023 A1 | 11/2012 | O'Kelley, II et al. |
| 2012/0297348 A1 | 11/2012 | Santoro |
| 2013/0231129 A1 | 9/2013 | Saville |
| 2013/0296048 A1 | 11/2013 | Jeffery et al. |
| 2014/0045589 A1* | 2/2014 | Paradise ............... A63F 13/00 463/29 |
| 2014/0280137 A1 | 9/2014 | Anderson et al. |
| 2014/0304328 A1 | 10/2014 | Capati et al. |
| 2015/0261496 A1 | 9/2015 | Faaborg et al. |
| 2015/0268717 A1 | 9/2015 | Schlumberger et al. |
| 2015/0328549 A1 | 11/2015 | Tanaka |
| 2016/0082353 A1* | 3/2016 | Christovale ........... A63F 13/816 463/7 |
| 2016/0166923 A1 | 6/2016 | Raj |
| 2016/0370882 A1 | 12/2016 | McGrath et al. |
| 2017/0028299 A1 | 2/2017 | The et al. |
| 2017/0113146 A1 | 4/2017 | Chung et al. |
| 2017/0136347 A1 | 5/2017 | Prasad et al. |
| 2017/0157511 A1 | 6/2017 | Feghali |
| 2017/0266564 A1 | 9/2017 | Choudhuri |
| 2019/0014206 A1 | 1/2019 | Kuhn et al. |
| 2019/0091544 A1 | 3/2019 | Huang |
| 2019/0217205 A1* | 7/2019 | Atli ....................... A63F 13/352 |
| 2019/0329134 A1* | 10/2019 | Shriram ............... H04N 21/816 |
| 2020/0090463 A1* | 3/2020 | Mohrhardt .......... G07F 17/3216 |
| 2021/0205715 A1* | 7/2021 | Boudville ............... A63F 13/56 |

OTHER PUBLICATIONS

Deep linking-Wikipedia, "Deep linking," 2018, 4 pages [Online] [Retrieved Nov. 20, 2018], Retrieved from the internet <URL: https://en.wikipedia.org/wiki/Deep linking >.

* cited by examiner

GAME MEDIATION INFRASTRUCTURE FOR ESTABLISHMENT OF MULTIPLAYER GAMING SESSIONS

RELATED APPLICATIONS

This application claims the benefit of Provisional Application No. 62/840,311, filed on Apr. 29, 2019, which is incorporated herein by reference.

BACKGROUND

1. Field of the Invention

This invention pertains to establishing and mediating multiplayer electronic game sessions.

2. Description of the Related Art

Many electronic games allow for multiplayer gameplay where players can play together or compete with one another within a session of the game. Some electronic games allow multiplayer gameplay to involve multiple devices, each running a copy of the game. Often, coordination of multiplayer gameplay among players can be difficult. For example, the players may not be able to coordinate to launch a game together; the players may get lost in in-game navigation and controls; some players may lack a copy of the game on their devices; or players may be unable to communicate in real time if they are not within speaking distance of each other. Furthermore, players may find multiplayer gameplay to lack a sufficient sense of the actions of, and interaction between, the players, which lessens the impact of the communal gaming experience.

SUMMARY

An environment includes one or more client devices, a game mediator server, and a game server connected by a network. Each client device includes a game mediator and/or a game. The game server executes game playing sessions of the games. The game mediator server and the game mediators on the clients form a game mediation infrastructure to mediate game playing sessions. For example, the game mediation infrastructure creates "lobbies" for game playing sessions and enables clients connected to lobbies to communicate with one another. The games receive interactions at the client devices and communicate with the game server to impact execution of game playing sessions.

In an embodiment, a method involves a first client device launching a game mediator and selecting a game. The game mediator server configures a lobby for the selected game. The first client device invites a second client device to the lobby. The second client device joins the lobby. The first client device instructs the game mediator server to launch the game. The game mediator server checks the lobby members and sends a deep link to the second client. Deep links link to a resource such as a game, and additionally specify a more specific context within the resource, such as a particular stage or state of the game. The second client installs the game. The game mediator server suggests to the first client device that the first client device invite device additional client devices to the lobby. After the first client device indicates that the game is ready to be begun, the game mediator server launches the game by communicating with the game server. The game server begins executing a game playing session.

In an embodiment, a method involves a first client device launching a game mediator, which initializes a lobby for configuring gameplay prior to playing. The game mediator creates the lobby. The first client device invites a second client device to the lobby. The second client device joins the lobby. The first client device selects a game. The game mediator server configures the lobby for the game. The first client device instructs the game mediator server to launch the game. The game mediator server verifies whether the client devices have the game installed, and upon determining that the second client device does not have the game installed, sends a deep link to the second client device, which causes installation of the game on the second client device. The game mediator server suggests to the first client device that the first client device invite additional client devices to the lobby. The game mediator server instructs the game server to launch a game playing session. The game server begins the game playing session.

In some embodiments, the game mediation infrastructure provides a communication channel outside of games themselves and allows the rapid establishment of the communication channel based on contextual information, such the current context of the game to be played. For example, in one scenario particularly useful for games run on personal computers or smartphones with easily-configurable, standard user interfaces, the game provides a user interface element that when used configures the communication channel (e.g., voice and video) to include the users who are presently establishing a gameplay session within the game itself. In another scenario in which the game itself allows users to join groups (hereinafter "game-defined groups"), the game provides a user interface element to all members of the game-defined group that when used by one of the members configures the communication channel (e.g., textual messaging) to include that member. This allows subsets of the users in a (possibly-large) game-defined group to communicate and begin a gameplay session. In another scenario, a user plays a game on one client device (e.g., a dedicated game console), and uses the game mediator on a different client device (e.g., a smartphone). The game informs the game mediation server that it is currently being played and has a network connection via a given local network ID (e.g., a Wi-Fi network). The game mediation server determines whether an instance of the game mediator on some client device has also registered itself as using that same local network ID, and if so, instructs that game mediator instance to configure a lobby user interface for use with that particular game. The user can then use the lobby user interface to invite others to join the game session.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
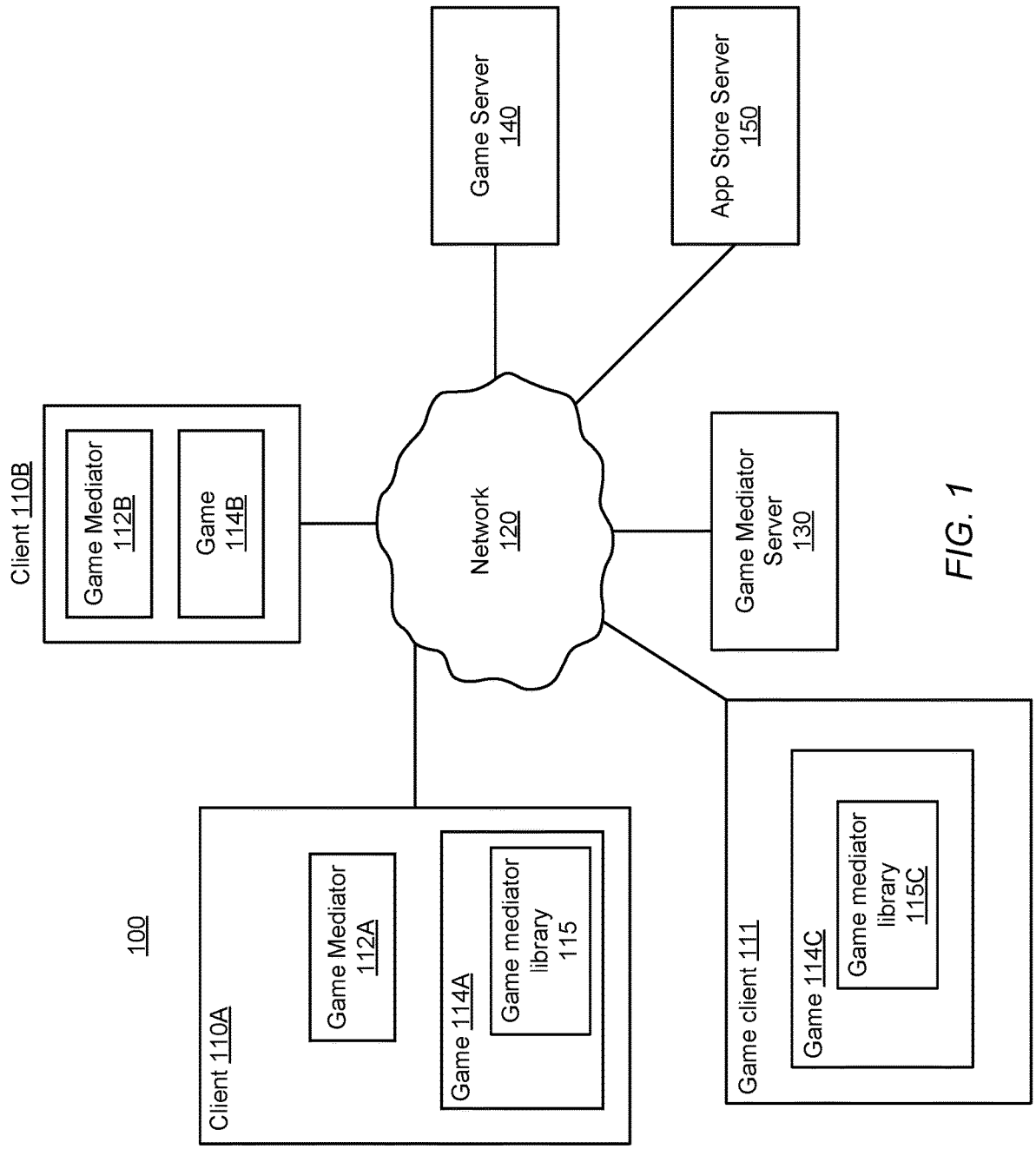
FIG. 1 is a high-level block diagram illustrating a game mediation environment, according to an embodiment.

FIG. 1 is a high-level block diagram illustrating an environment 100 in which game mediation takes place, according to one embodiment. FIG. 1 illustrates two clients 110A and 110B, a game mediator server 130, a game server 140, a game client 111, and an app store server 150 connected by a network 120. Only two clients 110, one game mediator server 130, one game client 111, one game server 140, and one app store server 150 are shown in FIG. 1 in order to simplify and clarify the description. Embodiments of the computing environment 100 can have many clients 110, game clients 111, game mediator servers 130, game servers 140, and app store servers 150 connected to the network 120. Likewise, the functions performed by the various entities of FIG. 1 may differ in different embodiments.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures.

A client device 110 (or for brevity, simply "client") is an electronic device used by a user to perform functions such as communication with other clients, executing software applications for various purposes, and consuming electronic content such as content hosted by web servers on the network 120. For example, the client may be a smart phone, a tablet computer, a notebook or laptop computer, a desktop computer, or any other computing system on which users may play, and/or interact with, electronic games. The client 110 includes a display on which the user may view content such as electronic games. In addition, the client 110 provides a user interface (UI), such as physical and/or on-screen buttons, which the user may interact with to perform various functions with the client.

In one embodiment, the client 110 includes a game mediator 112 and an electronic game 114, the game mediator 112 facilitating the creation of multiplayer gaming sessions with the electronic game 114 or other electronic games. Depending upon the embodiment, the game mediator 112 and/or game 114 may be integrated into the operating system, or implemented as an application or other software executing on the client 110. In some embodiments, the game 114 is part of the game mediator 112, rather than an independent software item. In other embodiments, the game 114 is distributed among a plurality of locations, for example, in part on the client 110 as an independent software item, and in part on the game server 140.

In some embodiments, the game mediator and the electronic game 114 need not be installed and/or run on the same client 110. Rather, in some embodiments the game 114 may be played on a separate game client device 111 (e.g., a dedicated gaming console, such as NINTENDO SWITCH or the XBOX ONE X, or SONY PLAYSTATION 4, or a general purpose computer such as a laptop or desktop computer running a commercial operating system such as MICROSOFT WINDOWS or APPLE MAC OS). In such embodiments, the game 114 may have or make use of a game mediator library 115, as described in more detail below, or the game client 111 may have a game mediator 112. The game mediator library 115 and/or the game mediator 112 provide the game client device 111 to be part of the game mediation infrastructure. The client device 110 may then be used in conjunction with the game client device 111, with its game mediator 112 serving as an independent means of interacting with the game session established via the game mediation infrastructure, such as by chatting with other game session participants, specifying portions of game sessions to be saved and shared, displaying video of other participants, or the like.

The game mediator 112 is a software module, such as an executable application, that runs on the client 110 (or game client 111) and mediates multiplayer gameplay. The game mediator 112 interacts with one or more games such as the game 114, as well as the game mediator server 130. The game mediation infrastructure used to enable game sessions includes at least the game mediator 112, and in some embodiments also includes the game mediator server 130 and/or at least one other game mediator 112 on at least one other client 110. Depending upon the embodiment, the game mediation infrastructure controls various aspects of a game playing session, such as providing a "lobby" user interface for the game playing session, and/or providing enriched gameplay. In one embodiment, a game playing session may be launched via a UI of the game mediator 112, such as the lobby, using a "deep link" (a link, such as a Uniform Resource Locator (URL), to a resource such as a game, and that additionally specifies a more specific context within the resource, such as a particular stage or state of the game). In an embodiment, the game mediator 112A runs on a first client 110A and interacts with a second client 110B, such as with a game mediator 112B upon the second client 110B, to enable client 110B to participate in the game playing session launched by client 110A. In other embodiments, more than one client 110 may be interacted with by the client 110A to enable participation in the game playing session launched by client 110A, e.g., up to as many as the game being played supports.

The lobby is a user interface that provides an environment for communication among clients 110 associated with a game playing session. The lobby allows clients 110 to communicate before, during, and/or after game playing sessions, such as by using live video feeds, screen capture feeds, and/or voice. In an embodiment, the lobby has functionality allowing at least one client 110 to configure game play settings of the game that is to be launched. In an embodiment, the lobby is executed at least in part upon the game mediator server 130. The lobby may further include various information about the game playing session, such as usernames or rankings of clients 110 for the game, as well as a level of the game or other information pertaining to the game playing session. For example, in some embodiments the lobby includes a chatroom in which client 110A exchanges text messages with client 110B. Alternatively or additionally, as another example, in some embodiments the lobby enables a video call (using live video feeds) with which users of clients 110 see and hear each other.

In some embodiments, one or more of the games 114 accesses a game mediator library 115. The game mediator library 115 contains executable code that integrates with the rest of the game mediation infrastructure (e.g., the game mediator 112 and the game mediator server 130) to facilitate the playing of multiplayer games. The game mediator library 115 may be a subset of the functionality provided by the game mediator 112 itself, so that software that incorporates the game mediator library 115 (such as games 114) can perform a subset of the actions of the game mediator 112, even without the game mediator 112 being installed. The game mediator library 115 may be wholly or partially statically linked into the game 114 itself, or the game mediator library may be stored externally to the game and accessed by dynamic linking. In some embodiments, the game mediator library 115 is included within the game mediator 112, so that if the game mediator is installed, the game mediator library is installed, as well. The game mediator 112 and the game mediator library 115 may both be referred to as being part of a game mediation infrastructure that encompasses both the game mediator 112 and the game mediator library 115 on the client devices, as well as the game mediator server 140. The game mediator library 115 may be (though need not be) created by the same organization that creates the game mediator 112 and/or the logic of the game mediator server 130. The game 114 itself may be created by any organization, such as an independent third-party game developer different from the organization creating the game mediator 112 and/or other components of the game mediation infrastructure. In some embodiments, game mediator libraries 115 are not employed, and instead the game mediators 112 themselves provide all the required functionality.

Figure 7:
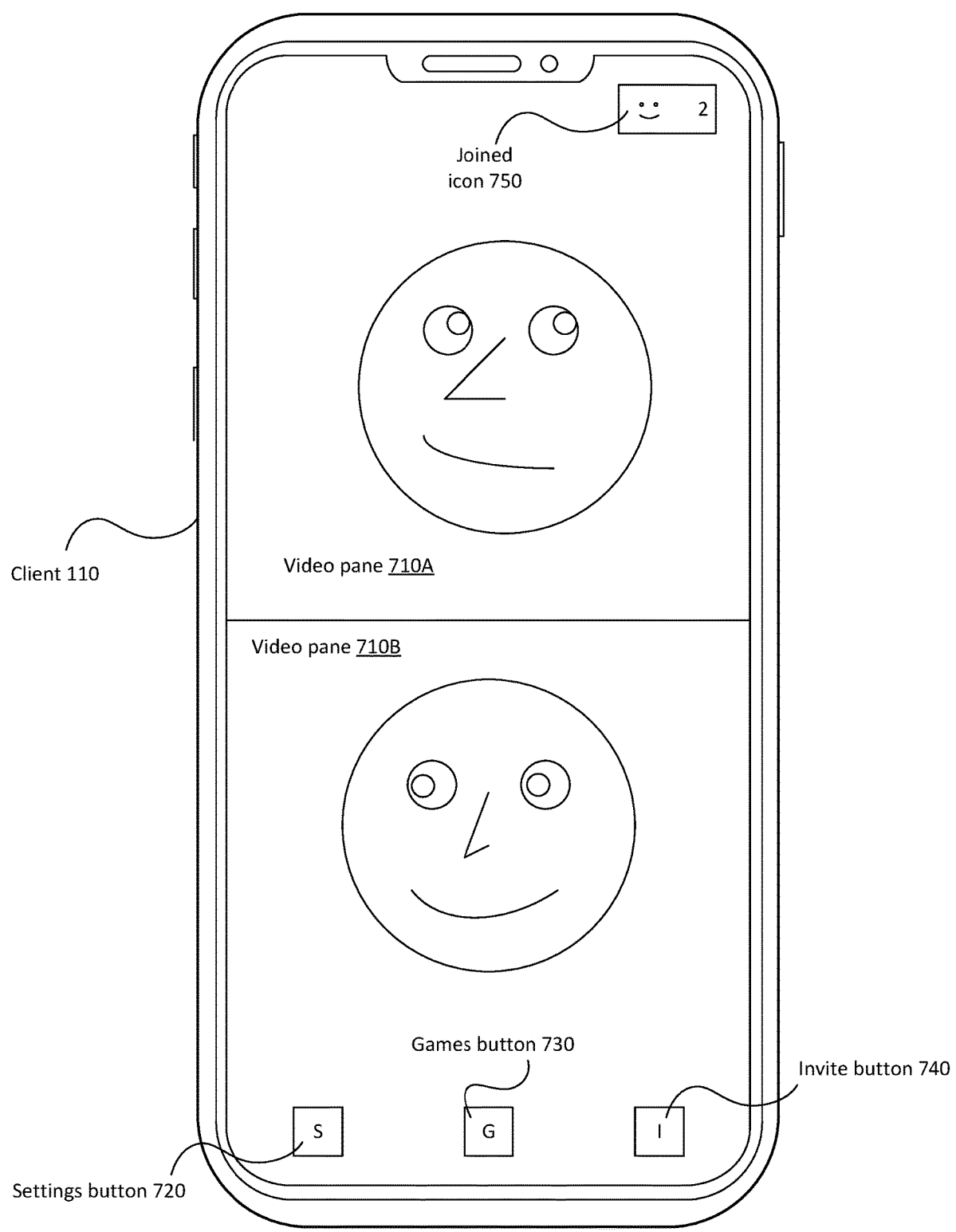
FIG. 7 illustrates a simplified example of a lobby according to a first embodiment.
Figure 8:
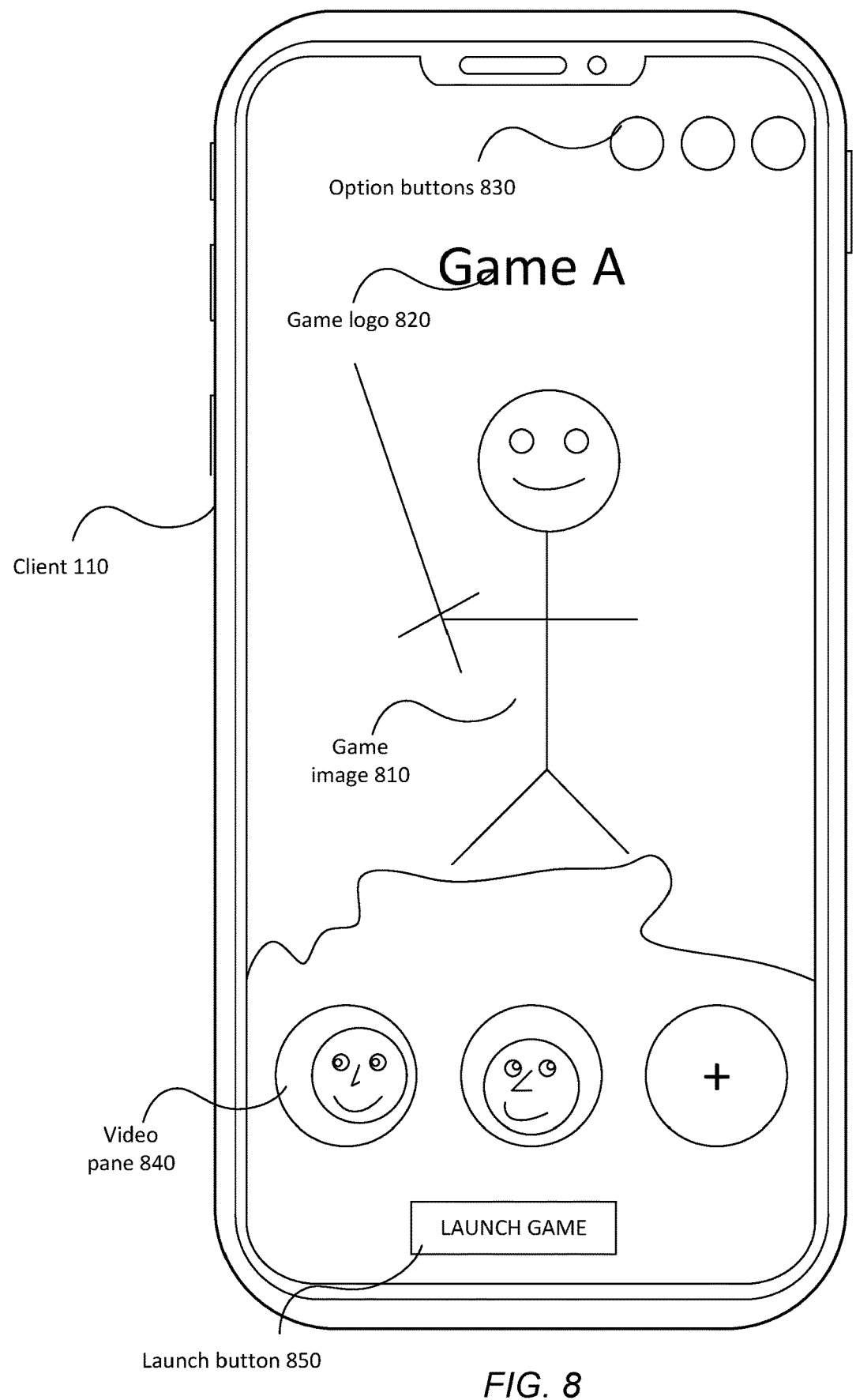
FIG. 8 illustrates a simplified example of a lobby according to a second embodiment.

FIG. 7 illustrates a simplified example of the lobby according to one embodiment, the lobby including video panes 710, a settings button 720, a games button 730, an invite button 740, and a joined icon 750. The lobby may provide a user interface such as a page or screen of the game mediator 112, which runs upon client 110, which in the example of FIGS. 7-8 is a mobile device. Each video pane 740 is associated with a client 110 joined to the lobby. For example, if clients 110A and 110B are joined to a lobby, there is a video pane 710A for client 110A and a video pane 710B for client 110B, as in FIG. 8. If additional clients 110 are joined to the lobby, additional panes may be added, which may involve modifying the boundaries of existing panes to accommodate the additional panes on the display. In an embodiment, additional panes are not added if a pane threshold is reached or surpassed. For example, the pane threshold may be a number of panes, or a pane size. Each video pane 710 presents a live video feed from the associated client 110, including both graphical and audio content. The live video feed may be, for example, from a camera of the client 110, e.g., displaying an image of the user of the client (or of whatever is in the field of view of the camera), from the content of the screen of the client (e.g., feed of screen capture), or the like. In an embodiment, the client 110 can disable the presentation of graphical and/or audio content of the client's 110 live video feed, for example, using the option buttons 730. In an embodiment, the client 110 can change the camera used to generate the live video feed, such as switching from a front-facing camera to a rear-facing camera of the client 110.

The option buttons 730 control settings of the game mediator 112. For example, in some embodiments, upon selection of an option button 730 by the client 110, the game mediator 112 loads a settings page. At the settings page, one or more settings may be adjusted using the client 110, such as enabling or disabling the transmission of audio and/or graphical content by the client 110, changing the camera used to generate the live video feed, muting one or more incoming live video feeds from other clients 110 joined to the lobby, and so on.

The option buttons 730 also control game selection in the game mediator 112. For example, upon selection of the games button 730 by the user of the client 110, the game mediator 112 loads a games page listing the games available for play. At the games page, a game may be selected using the client 110. For example, the games page may include a list of available games, including for each listed game a game title, a game icon or image, a game summary, and/or an on-screen button to select the game. For example, a listed game may have title "Fortnite™," an image of a game character, and a summary "compete in a battle royale." In an embodiment, the games page further allows the client 110 to select a portion of the game they wish to play, such as a track where they wish to race within a car racing game, or a location upon a map where a user character should be placed upon loading.

Upon selection of a game by the client 110, the game mediator 112 configures the lobby to attain a look and feel of the selected game based on one or more features of the game. The lobby may be configured to display graphical and/or textual elements of the game, such as a logo, a color scheme, one or more images from the game, and so on. For example, if "Fortnite" is selected, an image from the game of a game character may be displayed with the "Fortnite" logo overlaid as game logo 720. Other aspects of the lobby, such as video panes 710, may adjust to accommodate the configuration, as seen in FIG. 8, which illustrates a simplified example of a lobby according to a second embodiment.

FIG. 8 illustrates a different state of the lobby, e.g. after a game has been selected. FIG. 8 includes a game image 810, a game logo 820, option buttons 830, a video pane 840, and a launch button 850. The game image 810 is an image from game A, such as a game character holding a sword in a game landscape. The game logo 820 is the stylized title of the game, such as how it may appear in-game at a title screen. The option buttons 830 allow one or more settings to be adjusted, such as the transmission of audio and/or graphical content as part of a live video feed.

The video pane 840 is a video pane similar to video pane 710, though possibly of different dimensions. In an embodiment, each client 110 joined to the lobby is associated with a video pane that displays the associated client's 110 live video feed. In an embodiment, there are as many video panes as there are allowed players for the game, and if there are fewer clients 110 joined to the lobby than there are allowed players for the game, unused video panes include an icon, such as a "+" icon, which the client 110 may select to access an invitation page as detailed below. The launch button 850 prompts the game mediator 112 to launch a game playing session, e.g., to initiate execution of the game playing session.

Returning to FIG. 7, the invite button 740 controls invitation of clients 110 to the lobby, according to one embodiment. For example, upon selection of the invite button 740 by the client, the game mediator 112 loads an invitation page enabling a user of the client 110 to send invitations to join the lobby to other clients 110. For example, the invitation page may include a list of invitation techniques, including for each listed technique a technique title and a technique icon. For example, an iMessage™ listed technique may include the title "iMessage™" and an iMessage™ icon. The invitation page may also include a list of clients 110 to whom an invitation may be sent, each listed client 110 including, for example, a name. Upon selection of one or more clients 110 for invitation and selection of one or more invitation techniques, the game mediator 112 generates an invitation message and configures the selected invitation techniques such that the invitation message may be sent. For example, if the invitation technique is a text message and the invitee is a client 110 associated with the name "Justin," the game mediator 112 generates a textual invitation message, opens a text message application upon the client 110, addresses the text to the invitee, and pastes the invitation message into a message portion of the text message application. The client 110 may then send the invitation to the invitee using a button of the text message application.

The joined icon 750 indicates a number of clients 110 joined to the lobby. In the example of FIG. 7, there are two clients 110 joined to the lobby, hence the joined icon 750 indicates "2." In other embodiments, other icons may be present, as well as other buttons, graphical, and/or audio content. For example, the lobby may be configured to display a text string for each client 110 in the lobby indicating a name associated with the client 110. In an embodiment the lobby may include a list of other clients 110 that are playing games or are preparing to play games, which the client 110 may select to join another client's 110 lobby and/or game playing session.

In an embodiment, the lobby may be configured to allow the client 110 to initiate live streams of gameplay, using, for example, a livestream product such as Facebook Live™ YouTube™, or Twitch™. A live stream of gameplay involves sending a video of gameplay as seen on the screen of a client 110 playing in the game playing session to a client 110 not playing in the game playing session. Furthermore, clients 110 joined to the lobby or who select the lobby may choose to view the live stream, rather than participate in the game playing session. For example, if a game allows a maximum of four players and a fifth client 110 joints the lobby, the fifth client 110 may choose to livestream the game playing session despite being unable to play.

In an embodiment, a first client 110 may invite one or more additional clients 110 to a game playing session using the game mediator 112 via the game mediator server 130 (e.g., using the invite button 740 in the embodiment of FIG. 7). Upon receipt of an invitation, the game mediator 112 of each additional client prompts a user of the additional client 110 to either accept or reject the invitation. If the invitation is accepted, the game mediator server 130 may further interact with each accepting client 110 to enable participation in the game playing session. Furthermore, if the invitation is accepted, the respective client 110 is added to the lobby, for example, gaining the ability to participate in the chatroom or other communications functionality.

Returning to FIG. 1, the electronic game 114 interacts with the game mediator 112 to provide game playing sessions to users of clients 110. The game 114 may be a dedicated software application built natively to run on the operating system of the client 110, code (e.g., HTML 5 code) running within a game playing engine, such as (in some embodiments) the game mediator 112, a game built with a framework such as React Native™, or the like. A game playing session involves one or more users interacting with respective clients 110 to play a set of instances of the game 114 in coordination with each other. In multiplayer game playing sessions, multiple clients 110 participate in a single game playing session, interactively playing the same game. In single player game playing sessions, one client 110 participates in a single game playing session. In some embodiments, the game 114 runs on the game mediator server 130, and is accessed using the client 110, which provides an interface to play the game 114. For example, the game 114 executes upon the game mediator server 130, which sends the results of the execution of the game 114 to the clients 110. The clients 110 interact with the results of the execution that are received from the game mediator server 130 and send the interactions to the game mediator server 130, which impact the execution of the game 114. The game playing session may progress in this back and forth manner.

There may be different types of games, and the game mediator 112 and/or game mediator server 130 may support different types of games differently. One embodiment includes instant games and downloadable games. In such an embodiment, instant games can be played without downloading additional software. For example, the instant game may be at least partially integrated into the game mediator 112 such that the client 110 can launch a game without prior installation of additional software. If the client 110 launches a game playing session using the game mediator 112 for an instant game, the game mediator 112 does not check whether the client 110 has the game installed. In contrast, downloadable games require the downloading of the game by the client 110 before a game playing session can be launched. If the client 110 launches a game playing session using the game mediator 112 for a downloadable game, the game mediator 112 may check if the client 110 has the game installed.

The game mediator server 130 interacts with the clients 110 to support the operation of the game mediator 112. The game mediator server 130 configures the lobby launched by the game mediator 112 according to specifics of the game 114 launched in conjunction with the lobby. For example, the lobby may be configured to show which players are prepared to play a particular game, allow a user to invite other players or to initiate a live stream of game play, and to allow a user to enable configuration of gameplay settings specific to the game 114 (such as selecting a character to use, or arena in which to play).

Upon receiving a command to launch a game playing session, the game mediator 112 alerts the game mediator server 130, which checks each client 110 involved in the game playing session, e.g., by querying its game mediator 112. If a certain client 110 involved in the game playing session does not have the game 114 installed, the game mediator server 130 sends a deep link to the client 110, e.g., a deep link corresponding to an application store such as Apple App Store™ or Google Play Store™. The deep link then initiates installation of the game on the certain client 110 without exiting the game mediator 112. Alternatively, the deep link is sent to each client 110 involved in the game playing session regardless of whether the client 110 has the game installed or not. If the game is not installed, the deep link facilitates the installation of the game without the user leaving the lobby. The deep link may be a uniform resource locator (URL). In an embodiment, the deep link directs the client 110 to open an application vendor (e.g., an application store) to a page where the game may be downloaded, for example, in a web view of the game mediator 112. For example, the deep link includes an identifier associated with the page of the application vendor that is used by the client 110 to navigate to the page. In another embodiment, the deep link facilitates checking whether the game 114 includes a game mediator library 115. If client 110 and/or game mediator server 130, facilitated by the deep link, determines the game has the library 115, it transfers functionality to the game; for example, it may transfer voice and/or video stream controls to the game. Such a transfer allows the user to control various aspects of voice and/or video during gameplay without having to return to the lobby. In other embodiments, other functionality may be transferred to the game, such as livestream functionality, game invitation functionality, and so on. In such embodiments, one or more graphical elements, such as on-screen buttons with which a client 110 may interact to control functionality passed to the game, may be overlaid upon the game as it is displayed in the course of the game playing session. (The graphical user interface elements overlaid upon the game by the game mediator 112 or the game mediator library 115 are hereinafter referred to as the "overlay".) Furthermore, launching the game itself may involve the use of a deep link to access the game directly from the game mediator 112.

Furthermore, in some embodiments the game mediator server 130 checks the state of the lobby and, depending upon the number of clients 110 participating in the lobby, suggests to the client 110 who invited the others that more clients 110 could be invited. In an embodiment, the game mediator server 130 hosts the lobby. In an embodiment, when the game mediator server 130 configures the lobby according to the specifics of the game 114, the game 114 specifies the number of players required to play the game, to which the lobby adapts. For example, the lobby adapts to not launch a gameplay session until the required number of players are in the lobby. In an embodiment, if the minimum number of players are not present in the lobby to launch a game playing session, the lobby prompts the players to invite others. Furthermore, the lobby may be configured to display as many video panes as the game allows.

In some embodiments, lobbies may be private or public. In an embodiment, the player who created the game playing session sets the lobby as private or public. A public lobby is discoverable by users who wish to join a game. A private lobby is accessible only via invitation. Furthermore, the lobby may be configured to allow players who join the lobby to elect to participate in the game playing session as spectators. Spectators watch gameplay but do not themselves play. If a game has reached its maximum amount of players, additional players may only participate as spectators.

The game mediator server 130 proceeds to launch the game after receiving notifications that each client 110 that was sent a deep link installed the game and receiving a notification that the client 110 that commanded launching the game playing session declined to invite more clients 110. In an embodiment, the game is hosted on the game server 140, and the game mediator server 130 sends the game server 140 parameters associated with the game playing session, such as a session identifier, as well as parameters associated with each client 110, such as client identifiers. In other embodiments, parameters associated with the game playing session are sent to one or more other destinations to coordinate game play.

The game mediator 112 uses the client 110 functionality to enhance gameplay. The game mediator 112 may enable actions within the game mediator 112, such as in the lobby, to affect gameplay, or may enable actions within the game to affect the lobby. The game mediator 112 has access to the functionality of the client 110, further detailed in FIG. 2 below. Games such as the game 114 may use the functionality of the client 110 via the game mediator 112 by way of the game mediator library 115. For example, games may access video content of the clients 110 using the live video streams of the clients 110 in the lobby participating in the game playing session.

The game mediator 112 may enhance gameplay using the audio content of live video streams of the clients 110 in the lobby participating in the game playing session. Game events may be associated with audio cues, which the game mediator 112 detects and communicates to the game 114 via the game mediator library 115. Game events are associated with audio cues on a subscription basis. For example, in a charades game, each word in a set of candidate words is subscribed to a different audio cue which the game mediator 112 is set to detect depending upon which word is being guessed. If the word is "car," for example, the game mediator 112 listens for the word "car" and informs the charades game that it has been spoken. In an embodiment, the game mediator 112 also informs the game 114 which client 110 produced the audio cue. The audio content may also be used for voice recognition. For example, if multiple players are speaking, and one says the correct keyword, the correct player is awarded a point.

In some embodiments, the graphical content of live video streams of the clients 110 in the lobby participating in the game playing session may be used for gesture recognition to enrich gameplay, i.e., detecting (or subscribing to and then being notified by the game mediator 112 of) certain gestures, such as smiles, and awarding points to appropriately gesturing users within a game 114 responsive to detection of those gestures. As another example, if a particular client 110 participating in a game playing session chooses to overlay a graphic of a wolf's face upon its video pane in the lobby, its character within the game 114 could likewise gain a wolf façade.

In an embodiment, the game mediator server 130 uses external live streaming, rather than the content of live video streams within the lobby, to enhance gameplay. For example, in a pictorial guessing game, the livestream (such as on Facebook Live™ or Twitch™) may be used for players, i.e. viewers of the livestream, to guess what the picture is. The game 114 subscribes to the game mediator 112 to listen for certain keywords, and upon detection of those keywords, awards points appropriately to the participant who guessed correctly by saying the keyword, similar to the use of audio content of the live video streams of the clients 110 in the lobby.

In some embodiments, the game mediator server 130 provides enriched gameplay functionality by enabling game events to affect the lobby. Game events may be tagged for game mediator 112 enrichment using the game SDK/engine 230. Upon occurrence of the game event within the game playing session, the lobby is adjusted based on the tagged event, as discussed below with respect to FIG. 5. Depending upon the embodiment, the lobby may be adjusted by affecting one or more video panes, audio, or so on. For example, upon an event involving a wolf occurring within the game playing session, the client 110 who prompted the event may have a wolf mask graphic overlaid upon their video pane in the lobby. As another example, a player's audio content may be filtered to create an audio effect, such as filtering a voice to sound like a dog barking. As a third example, if the game mediator server 130 determines that two clients 110 are within a threshold geographical distance of each other, the game mediator server 130 sends a command to one of the two clients 110 to mute the volume of the game 114 (or of specific portions of the game 114, such as background music, or the audio content of the live video stream) so as not to have duplicative sound played within a given area. In some embodiments, to determine the geographical distance between clients, the game mediator server 130 obtains and analyzes device sensor data from the clients 110, such as their geolocations (e.g., distance between GPS coordinates) and/or speaker input (e.g., whether there is an echo or other duplicative sounds of the game). In other embodiments, enriched gameplay functionality is provided by the game mediators 112 collaborating in a peer-to-peer configuration, without the use of the game mediator server 130.

The game mediator server 130 and/or the game mediators 112 may further use deep links for purposes other than game installation or gameplay initialization. For example, the game mediator server 130 may obtain information about the gameplay preferences of the user of a client 110 by using deep links to send requests to each of some set of games, such as a predetermined set of games representative of various categories of game.

The operating system of the client 110 attempts to relay the deep link request to the applications; if the applications are not installed on the client, the operating system informs the game mediator 112 of an error. The game mediator 112 then stores (e.g., as a bit vector) whether each of the games of the set is installed based on whether the operating system indicated an error in response to the sending of the deep link requests. In some embodiments, the game mediator 112 further makes decisions or identifies implicit preferences for a particular client 110 based on which of the set of games is installed on that client 110. For example, the game mediator 112 might determine, based on the set of games installed on a given client 110, that the user of that client 110 primarily enjoys puzzle games, and adjust the order of the games available to play, or the look and feel of the lobby, to reflect the user's interest in puzzle games. The game mediator 112 may also identify users connected to the user associated with the client 110, e.g., friends of the user, who also enjoy games of the type determined to be the user's preference. The game mediator 112 may suggest to the user that the user invite the identified friends to a game. Alternatively, the game mediator 112 may identify other users to whom the user is not connected (e.g., has never played with) and who enjoy similar games, and may recommend to the user that the user play with the identified users. Furthermore, the game mediator 112 may use the user's preference to suggest additional games, e.g., games of the same type, that the user may enjoy playing. The game mediator 112 may also use the user's preferences when determining an advertisement or other sponsored content to display to the user. These various actions may be performed using deep links, e.g., by collecting data on the client 110 as the client 110 uses deep links, as described below, and developing implicit preferences for the client 110.

Deep links can indicate a particular application to run via the domain portion of the URL, and additional information for the application via the parameters of the URL. For example, to initiate a game 114 on a client running the IOS™ operating system, a deep link "https://abcd.app.link/connect?mode=internet&teamPassword: 12345&bunchRoom=rkHyuCojz&bunchAuth= SJWpHXZzX" might be used, where "https://abcd.app.link" indicates the application, and "mode=internet&teamPassword: 12345&bunchRoom=rkHyuCojz&bunchAuth= SJWpHXZzX" indicates the game parameters, which in this example are "mode," "teamPassword," "bunchRoom," and "bunchAuth." Using this link, a client 110 may launch a game "abcd" over the internet with other clients 110 as part of a team, which may be joined to a lobby specified by the "bunchRoom" and authorized using the "bunchAuth." Additional parameters may be added in this manner to the deep link, such that each game 114 may have a customized deep link to enable various gameplay customizations to launch the game 114 using the game mediator 112. For example, the deep link may additionally include a "skin" parameter used to specify a particular character graphic to use in the game 114. As a second example, the deep link may additionally include a "level" parameter used to specify a particular level of the game 114 into which to launch.

In an embodiment, one or more parameters are encoded (e.g., into a base 64 payload), such as that in the deep link "https://abcd.onelink.me/4289444349?payload= eyJhY3Rpbc24iOiJidW5jaC5yb29tIiwiZ2FtZVR5cGUi- OjEsInJvb21Ub2tlbiI6InJrSHl1Q29qeiJ9&bunchUID= rgBU5KlNmWhL7Od0NOGM4kWfEXD3&bunchRoom= rkHyuCojz&bunchAuth=SjWpHXZzX", where the data in the "payload" parameter can be decoded to obtain other parameter values. The use of base 64 encoding provides flexible information encoding such as special Unicode used to represent the payload.

As another example, to initiate downloading a game 114, a deep link "https://itunes.apple.com/us/app/id570510529?mt=8" might be used, where "https://itunes.apple.com/us/" indicates the application store ITUNES™, and "app/id570510529?mt=8" indicates an application identifier used to specify the game 114 to be downloaded. As a still further example, to check whether a game 114 is installed on a client 110, a deep link "abcd://" might be used to determine whether the game 114 is stored in memory upon the client 110. For example, if the deep link does not lead to a folder in memory, the game mediator 112 may determine that the game 114 is not installed.

In some embodiments, the game 114 is hosted by the game server 140, which runs the game playing session. Each game 114 interacts with the game that is run on the game server 140 to generate the game experience on the clients 110. For example, if a user playing a game 114 on a client 110 performs an action within the game 114, the action is communicated to the game server 140, which handles that action and applies it to the corresponding game session, populating that action and its effects to any other clients 110/game mediators 112 that are participating in that session. Upon occurrence of events associated with enriched gameplay functionality (such as an in-game interaction with a certain game character), the game server 140 notifies the game mediator server 130 of the event and the client 110 that triggered the event. In an embodiment, the game mediator server 130 tracks the game session and identifies events with enriched gameplay functionality.

The network 120 enables communications among the clients 110, the game mediator server 130, and the game server 140, and can comprise the Internet as well as mobile telephone networks. In one embodiment, the network 120 uses standard communications technologies and/or protocols. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The entities can use custom and/or dedicated data communications technologies instead of, or in addition to, the ones described above.

Figure 2:
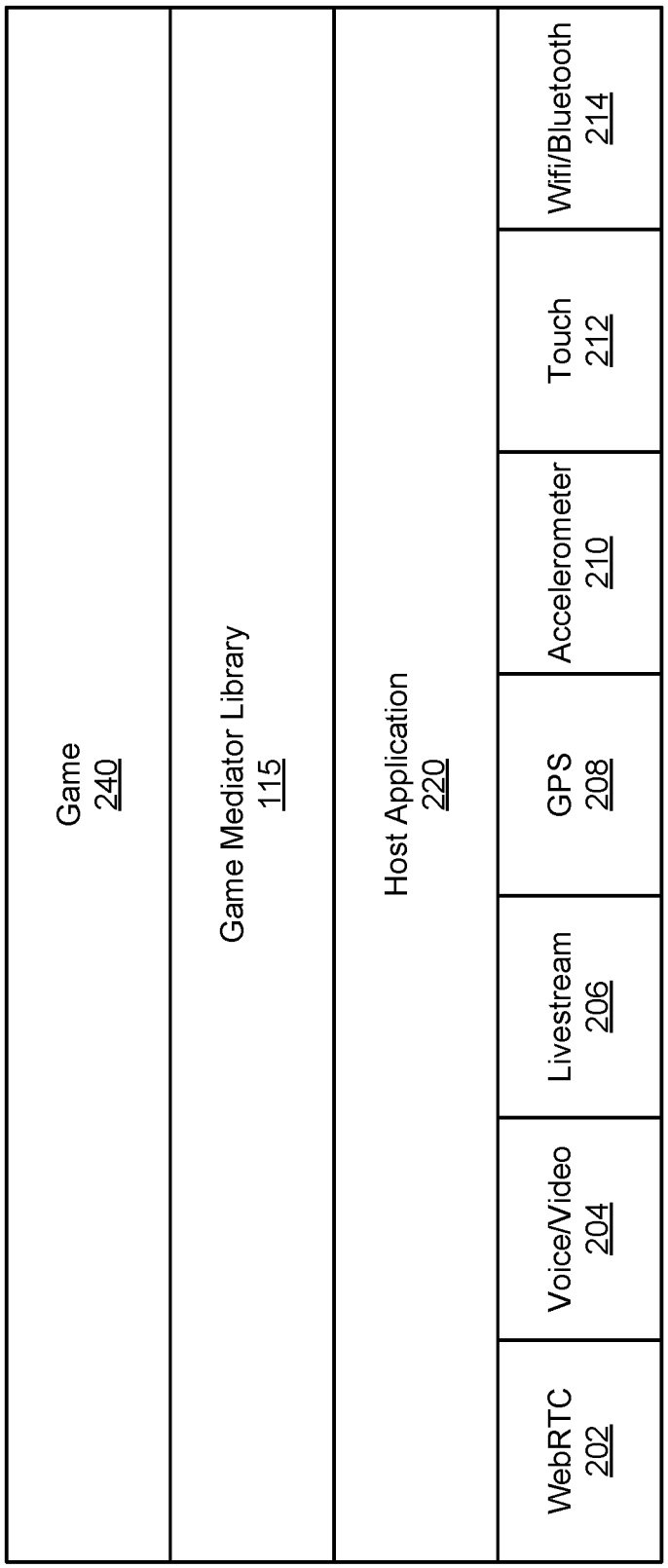
FIG. 2 is a high-level block diagram of a software stack upon which the game mediation system operates, according to an embodiment.

FIG. 2 is a high-level block diagram of the software stack upon which the game mediation infrastructure operates, in one embodiment. At a first or bottom layer reside software components that drive low level functionality including hardware functionality, including WebRTC 202, Voice/Video 204, Livestream 206, GPS 208, Accelerometer 210, Touch 212, and Wifi/Bluetooth 214. At a second layer resides software that drives a host application 220, such as an operating system. At a third layer resides the game mediator library 115. At a fourth or top layer resides a game 240 (e.g., a game 114 of FIG. 1).

The WebRTC 202 component enables web browsers to communicate in real time. The Voice/Video 204 component enables use of audio and/or video capabilities of the client device 110. The Livestream 206 component allows for communication of video in real time. The GPS 208 component provides location information of the client device 110. The Accelerometer 210 component provides acceleration information of the client device 110. The Touch 212 component enables touch input to the client device 110. The Wifi/Bluetooth 214 component enables Wifi and/or Bluetooth functionality to the client device 110.

The host application 220 manages operation of the client 110 and its software and hardware components. The game mediator library 115 (in embodiments in which it is employed) provides a software framework used by the game mediator 112 and/or the game 240 (e.g., game 114 of FIG. 1), allowing for the interactivity needed to enable mediated and/or enriched gameplay sessions. In some embodiments, the game mediator 112 and game 240 are managed by the host application 220. For example, the host application 220 allocates memory for both the game mediator 112 and the game 240.

Figure 3:
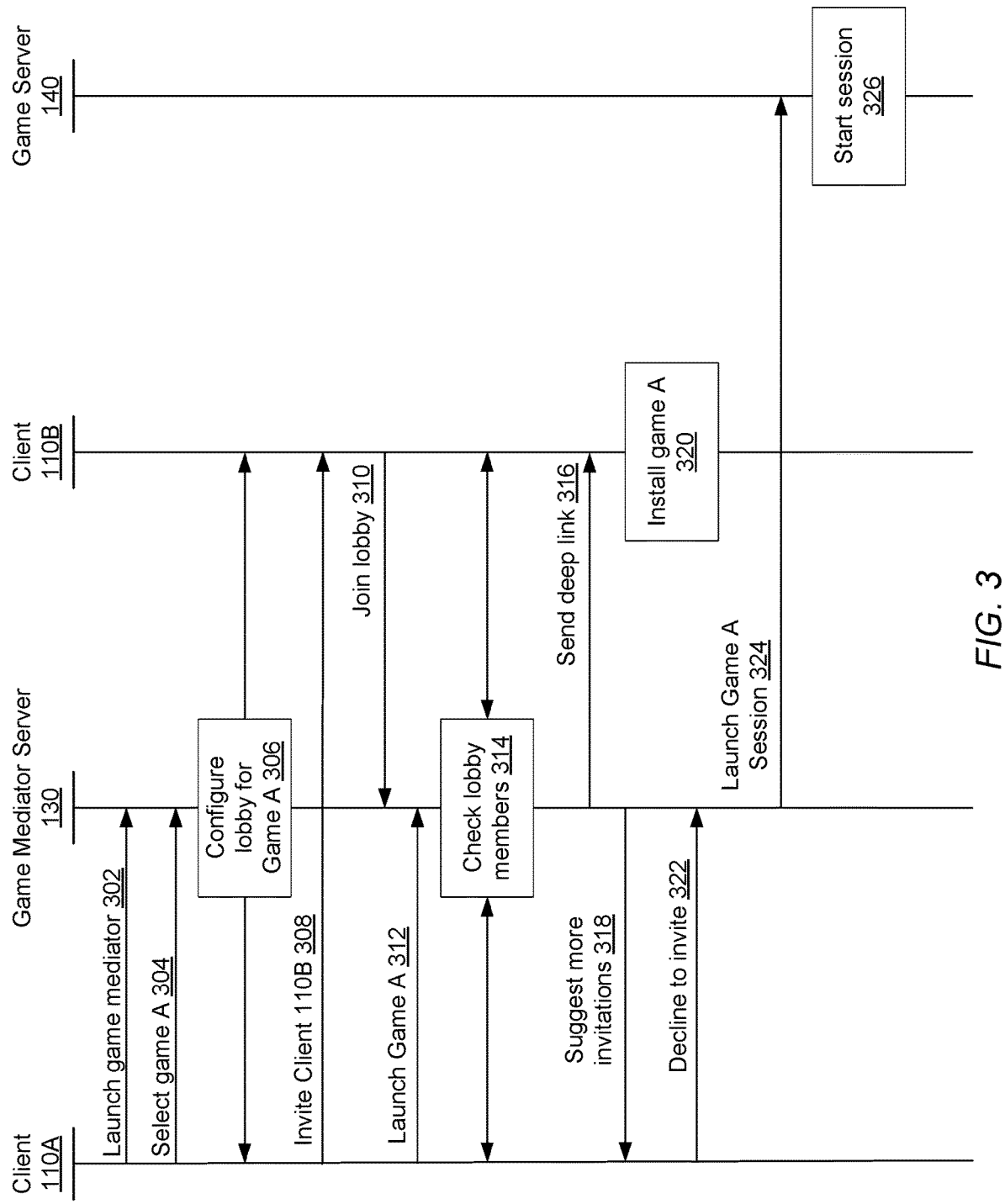
FIG. 3 illustrates a process of launching a multiplayer game playing session using the game mediation system, according to a first embodiment.

FIG. 3 illustrates the process of launching a multiplayer game playing session using the game mediation system 100, in one embodiment. In this embodiment, the game session runs on the game server 140. In other embodiments the game session runs elsewhere, e.g., on the client 110 within the game mediator 112, or an independent software item upon the client 110 similar to the game 114. Where the game runs may depend upon the type of game, such as instant games versus downloadable games, as detailed above. In the embodiment of FIG. 3, the game mediator 112 coordinates with the game mediator server 130 to provide game mediation functionality. In other embodiments, game mediation is provided solely by the game mediator 112.

First, client 110A launches 302 the game mediator 112A. For example, the client 110A may open the game mediator 112A as an application, loading it into memory for use. The game mediator 112A communicates with the game mediator server 130 to initiate game mediation. Upon selection 304 of a game 114 by the client 110A, e.g., using the game mediator 112A, the game mediator 112A communicates with the game mediator server 130 to configure 306 a lobby for the game 114. In an embodiment, the game mediator 112A and/or game mediator server 130 coordinate to configure the lobby to attain a look and feel of the game 114 as well as to provide communication between the clients 110 in the lobby.

The client 110A invites 308 other clients, such as the client 110B, using the game mediator 112A. The game mediator 112A facilitates invitation via one or more techniques. For example, the game mediator 112A may send a notification to the game mediator 112B on the client 110B, alerting the client 110B that the client 110A has invited the client 110B to a game playing session. In some embodiments, the alert includes a textual notification upon the client 110B's display. Depending upon the embodiment, the notification may be sent via email, telephone call, or text message, or by way of other social networking applications, such as Facebook™, Twitter™, GroupMe™, WhatsApp™, Snapchat™, LinkedIn™, and/or other applications. For example, the game mediator 112A may generate a text message to the client 110B that links to the lobby, which the client 110A may send using a text message application.

Upon the client 110B's acceptance of the invitation, via, for example, sending a request to join the lobby to the game mediator server 130, the game mediator server 130 joins 310 the client 110B to the lobby, thus enabling the client 110B and the client 110A to communicate. For example, the lobby may include a video, audio, and/or textual chatroom with which the clients 110 joined to the lobby may communicate. In an embodiment, the lobby updates to indicate that a new client (the client 110B) has joined the lobby. This may entail updating a player count, adding a video pane to the lobby, adding a player graphic or icon, and so on.

The client 110A commands the game mediator 112A to launch 312 the game 114. In response, the game mediator 112A commands the game mediator server 130 to check 314, via the game mediator 112 upon each client 110 joined in the lobby, whether the client 110 has the game 114 installed. In the example of FIG. 3, the client 110B does not have the game 114 installed. As such, game mediator server 130 sends 316 a deep link to client 110B which, upon receipt, initiates installation 320 of the game 114 upon the client 110B. For example, upon receipt of the deep link, the client 110B displays a button linking to a download page for the game 114. In an embodiment, the client 110B also displays a graphic and/or textual summary of the game 114. When the client selects the button, the download page opens (e.g., in a web view within the game mediator 112B) where the client 110B may download and install 320 the game 114. The download page may be, for example, a page in an application store.

In an embodiment, the game mediator server 130 sends a request to verify installation of the game 114 to each client 110. Upon receipt of the request and verification of installation of the game 114, each client 110 sends a notification to the game mediator server 130 verifying that the game 114 is installed upon the client 110.

In an embodiment, upon determining that each client 110 joined to the lobby is ready for the game playing session to launch, e.g., upon verifying that each client 110 downloaded the game 114, the game mediator server 130 sends a deep link to each client 110 joined to the lobby linking to a particular point in the game 114. When a game session is launched, the clients 110 joined to the lobby start the game 114 at that particular point, as specified in the deep link. For example, when the game session is launched, rather than opening the game 114 to a start page, the game 114 opens to an in-game lobby or loadout page. As a second example, when the game session is launched, the game 114 may open to a particular level or location within the game 114.

Meanwhile, upon determining (via the check 314) that more clients 110 could be invited to the game playing session, the game mediator sever 130 suggests 318 to the client 110A (the client 110 that initiated the game playing session) that more invitations be sent to additional clients 110, e.g., via a notification sent to the client 110A. In this example, the client 110A declines 322 to invite more players, so game mediator server 130 proceeds to launch 324 a session of the game 114 by communicating with the game server 140. In an embodiment, launching 324 the session of the game 114 involves sending to the game server 140 a set of client identifiers, each client identifier of the set corresponding to a client 110 joined to the lobby. Game server 140 then starts 326 the game playing session. In an embodiment, the game playing session is assigned a session identifier by the game server 140, and the session identifier is used to distinguish the game playing session from other game playing sessions. In such an embodiment, launching the game involves sending the session identifier to each client 110 associated with a client identifier that was received by the game server 140. In this embodiment, the clients 110 communicate gameplay instructions to the game server 140 along with the session identifier, and the game server 140 communicates gameplay results to the clients 110 using the client identifiers associated with the session. For example, if a first client 110 playing the game 114 swings a sword, the sword swinging gameplay instruction is communicated to the game server 140 along with the session identifier to impact the associated game playing session. Similarly, the gameplay results of the gameplay instruction are communicated to the first client 110, such as graphics to render, audio to play, and/or so on.

Figure 4:
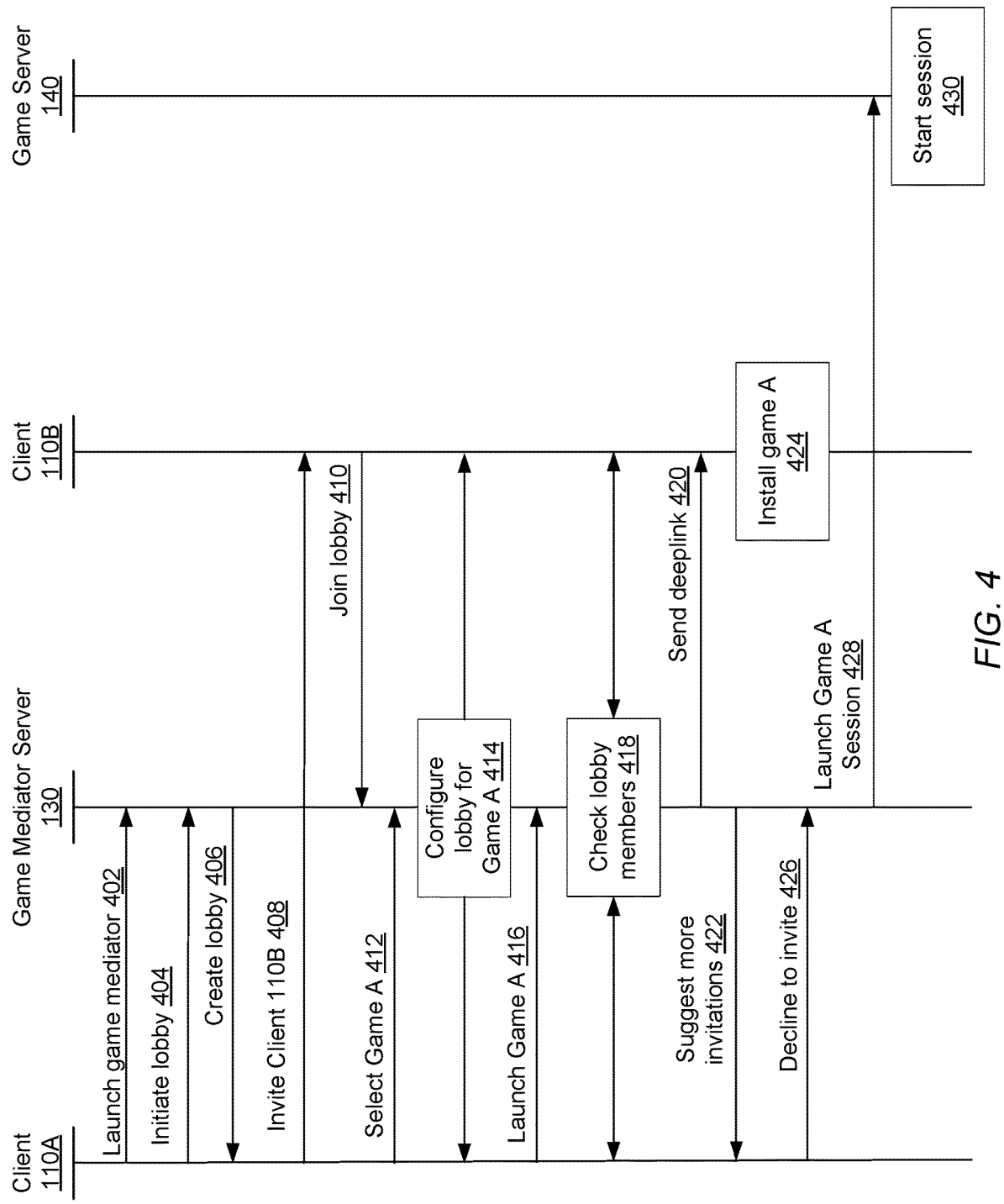
FIG. 4 illustrates the process of launching a multiplayer game playing session using the game mediation system, according to a second embodiment.

FIG. 4 illustrates the process of launching a multiplayer game playing session using the game mediation system 100, according to a second embodiment in which the lobby is launched before the game 114 is selected. The client 110A launches 402 the game mediator 112A. The client 110A then initiates 404 a lobby, which the game mediator server 130 proceeds to create. Because the lobby is not for a specific game, it is not configured according to any game's look and feel. Instead, the lobby is a generic lobby. For example, the lobby includes video chat frames and one or more icons and/or on-screen buttons, but no particular color scheme or graphics. In an embodiment, the lobby follows a color scheme consistent with other pages of the game mediator 112.

The client 110A (the client 110 that initiated 404 the lobby) then invites 408 the client 110B to the lobby. The client 110B accepts the invitation and thereby joins 410 the lobby. The client 110A then selects 412 the game 114 from within the lobby. For example, the client 110A selects an on-screen button within the lobby, opening a page listing a plurality of games, from which list the client 110A selects 412. Upon selection 412 of a game—in this example, the game 114—the game mediator server 130 and/or the game mediator 112 configure 414 the lobby for the game 114 to attain a look and feel appropriate for the game 114.

The process then proceeds similarly to the process of FIG. 3. The client 110A launches 416 a session of the game 114. The game mediator server 130 and/or the game mediator 112 checks 418 the clients 110 joined to the lobby. The game mediator server 130 sends 420 a deep link to the client 110B after determining that the client 110B does not have the game 114 installed. The game mediator server 130 also suggests 422 to the client 110A that the client 110A send more invitations. The client 110B installs 424 the game 114, and the client 110A declines 426 to invite additional clients 110. The game mediator server 130 thus launches 428 the session of the game 114, which prompts the game server 430 to start the game session 430.

In an alternate embodiment, the client 110A launches the game mediator 112A and selects a game 114, which launches a session of the game 114. In such an embodiment the client 110A may invite other clients 110 to the game session from within the game session, for example, using on-screen buttons of the game mediator 112A overlaying the game session.

Figure 5A:
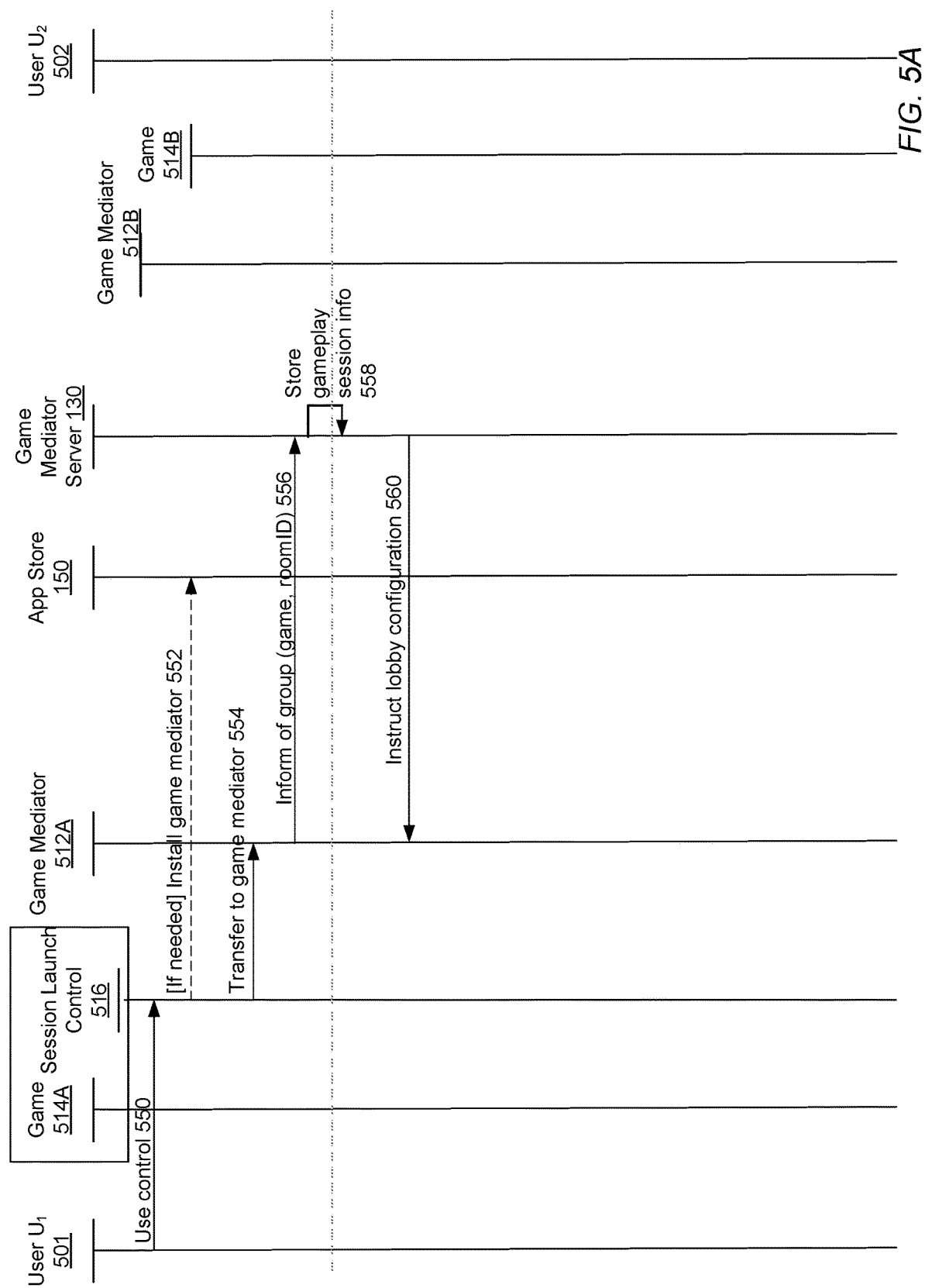
FIGS. 5A and 5B illustrate the interactions between the various components of the environment of FIG. 1 when establishing and using multiplayer game sessions, according to some embodiments.

FIG. 5A illustrates the interactions between the various components of the environment of FIG. 1 when establishing multiplayer communication, according to one embodiment.

User $U_1$ 501 has a client device having the game instance 514A and the game mediator 512A (a process/instance of the game mediator 112 executing on the client device). User $U_2$ 502 has a client device likewise having the game instance 514B and game mediator 512B. The game 514 itself provides a user interface for establishing a multiplayer gaming session for use when playing the game 514, but this user interface may not provide any communication ability between the users as the session is being established, instead requiring them to communicate via separate channels, such as the users' smartphones, which can be time-consuming and inconvenient. In the example of FIG. 5A, user 501 and user 502 are both tentatively joined in a multiplayer gaming session for the game 514, in that they have used the user interface of the game 514 to be grouped together for an upcoming gameplay session within the game.

Figure 6:
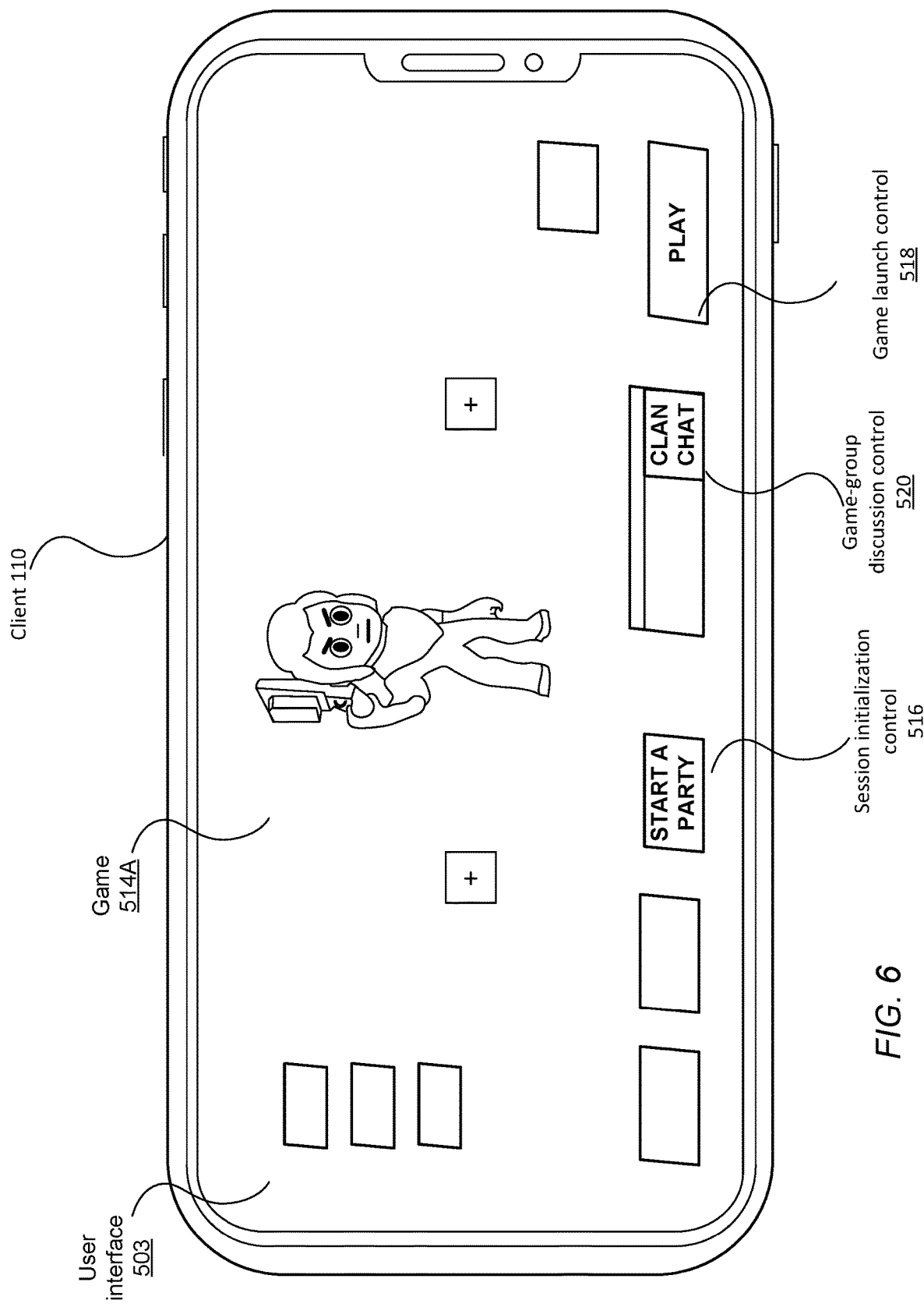
FIG. 6 illustrates session initialization controls included within the user interface of a game 514A.

The game 514A provides a session launch control 516, which is a user interface element that invokes the functionality of the game mediation infrastructure to rapidly join the users together in a multiplayer gaming session within the game mediation infrastructure, as well as providing additional ways to more rapidly configure the multiplayer gaming session. For example, FIG. 6 illustrates a session launch control (a "Start a Party" button in the example of FIG. 6) included within the user interface 503 of the game 514A.

User $U_1$ 501 uses 550 the session launch control 516 to initiate a multiplayer gaming session from within the game 514A. In some embodiments, the use 550 of the session launch control verifies whether the game mediator 512 and/or the game mediator library 115 are installed on the client device of the user $U_1$ 501, transferring control to the app store 150 if not so that they can be installed 552.

Control is then transferred 554 to the game mediator 512A via a message containing relevant contextual information, such as an identifier of the game being played (that is, the game 514), and an identifier uniquely corresponding to the list of users currently prepared to play the game together (e.g., $U_1$ 501 and $U_2$ 502). The format of the message is specified by the game mediator process 512A (or, equivalently, by the game mediator 112 or which the process 512A is one executing instance) in the sense that the game mediator expects the message to have a given format, and the game 114 conforms to that format in order to interact with the game mediator 112. In one embodiment, the transfer 554 is effected, and the contextual information is provided, via a deep link message that references the game mediators. For example, in one embodiment the format of the deep link is <gameMediatorAppName>/<roomID>/<gameName>, where <gameMediatorAppName> indicates, to the operating system of the client device 111 on which the game 514 is installed, the name for launching the game mediator 512, <roomID> is an ID shared by the users currently establishing the game session within the game 514, and <gameName> is an identifier of the game. For instance, the deep link https://bunch.live/A83jiklqw7/clashroyale indicates that the name of the application for the game mediator 514 is "bunch.live", the game being played is Clash Royale™, and "A83jiklqw7" is an identifier uniquely corresponding to the session of the users in question (e.g., $U_1$ 501 and $U_2$ 502). The game 514 is designed to select the <roomID> for a given set of users currently preparing to play the game together such that it is different from the <roomIDs> selected for a different set of users, as well as to specify its own identifier for <gameName>.

The game mediator process 512 provides 556 some or all of the contextual information to the game mediator server 130. The game mediator server 130 accordingly stores 558 the provided contextual information about the gameplay session. In some embodiments, the game mediator server 130 instructs 560 the game mediator 512A of the user 501 to configure its lobby according to the contextual information (e.g., that the game to be played is game 514 and that $U_1$ 501 is currently in the session). In some embodiments, the game mediator 512A performs the lobby configuration in response to the transfer 554, rather than in response to an instruction 560 from the game mediator server 130.

In a manner similar to that of steps 550-560, when user 502 likewise wishes to join the gameplay session, the game 514 will provide the same <roomID> and <gameName> as it provided to user 501, which will cause the game mediation infrastructure to place the user 502 into the same gameplay session (and corresponding lobby) as the user 501. The game mediator server 130 can notify the game mediators 512 of the users involved each time that a user joins the session, and the game mediators 512 can update their lobbies accordingly, e.g., indicating that the new user has joined. In some embodiments, rather than the user 502 also manually using the control 550 to join the gameplay session, the game mediator server 130 may prompt the user 502 to agree to do so. For example, the game 514A may include an identifier of the user 502 along with the other information at step 554. The game mediator server 130 may then use this identifier to cause the game mediator 512B of the user 502 to provide the user 502 with a prompt to join the game session established by the user 501.

At this point, the lobbies are configured according to the game being played (game 514) and the current participants (users $U_1$ 501 and $U_2$ 502). This avoids the need for the users to explicitly start use of their game mediators 512 and to join each other into the session; rather, they simply leverage the fact that they were already in the game 514 together to appropriately configure the lobby of the game mediators 512. Other actions—such as adding more users to the gameplay session via the lists of the users' known friends stored by the game facilitation infrastructure (e.g., on the game mediator server 130), or commencing actual gameplay of the game 514 (or otherwise transferring control back to the game), can proceed within the lobby interface as in steps 416 et seq of FIG. 4, e.g., using deep links to transfer control to the game 514A and to pass it the appropriate game configuration parameters. Communication capabilities of the lobby user interface, such as voice and video chat, can also be used to ease the burden of coordinating the remainder of the gameplay session, and of communicating with each other while actual gameplay is taking place.

Figure 5B:
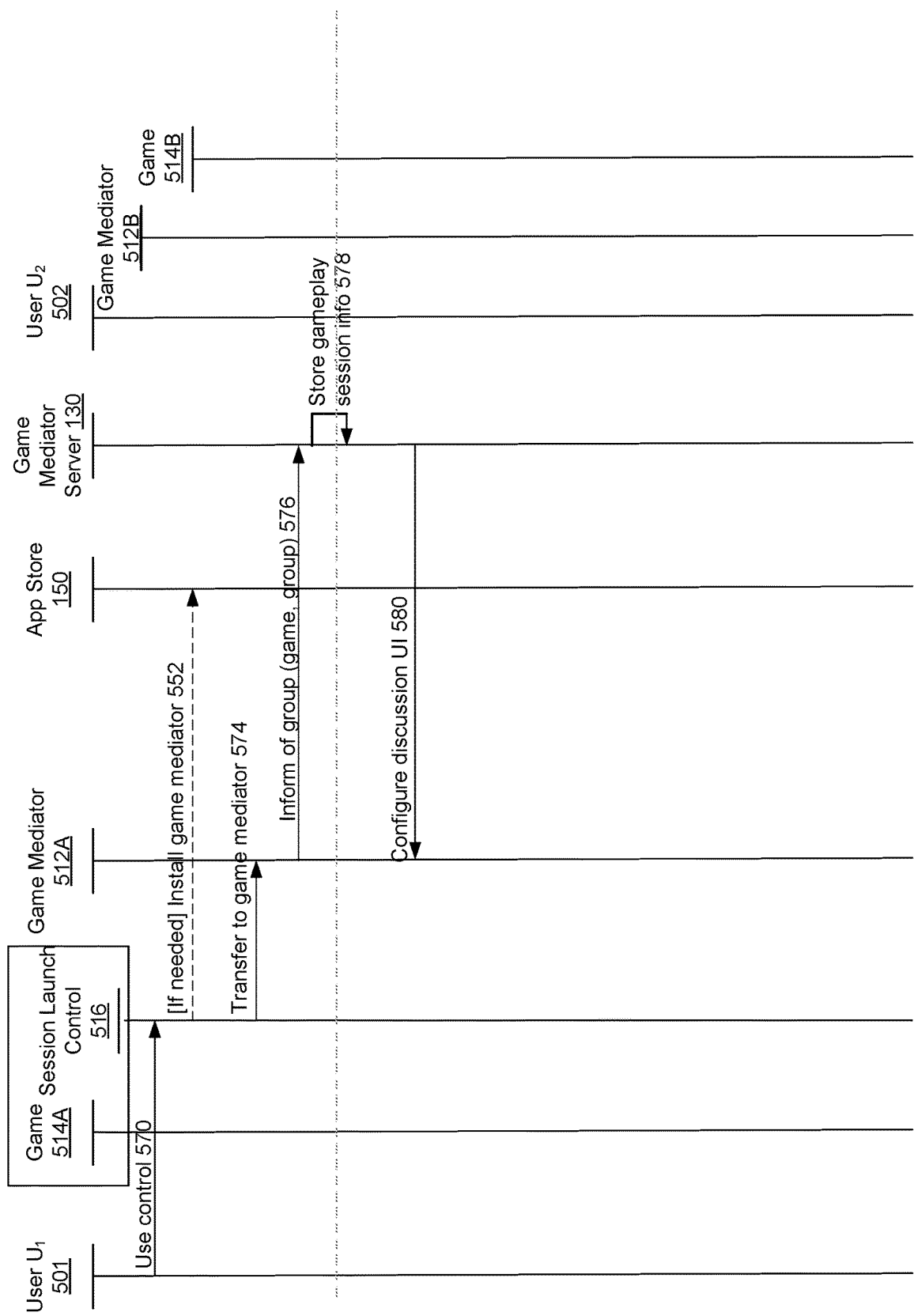

FIG. 5B illustrates the interactions between the various components of the environment of FIG. 1 when establishing and using multiplayer communication according to different information of the game, according to one embodiment.

As with FIG. 5A, user $U_1$ 501 has a client device having the game instance 514A and the game mediator 512A. User $U_2$ 502 has a client device likewise having the game instance 514B and game mediator 512B. The game 514 itself allows definitions of groups of users of the game interface for establishing a multiplayer gaming session for use when playing the game 514 (e.g., a clan from Clash Royale™). However, as described with respect to FIG. 5A, this user interface may not provide any communication ability between the users as the session is being established, instead requiring them to communicate via separate channels. In the example of FIG. 5B, user 501 and user 502 are both members of a group defined by the game 514 (e.g., a group established by user 501 within the game 514, and which user 502 joined within the game).

The game 514A provides a game-group discussion control 520, which is a user interface element that invokes the functionality of the game mediation infrastructure (e.g., the game mediator library 115) to enable quick and convenient communication capability between the users of the in-game group (e.g., users 501 and 502, as well as all the other members of the in-game group), as well as to provide additional ways to more rapidly configure the multiplayer gaming session. For example, FIG. 6 illustrates the game-group discussion control 520 (a "Clan Chat" button in the example of FIG. 6) included within the user interface 503 of the game 514A. The in-game group may be large, such as 50 members, 100 members, or the like. Coordination of, and communication between, all these users would be difficult using traditional means, such as external channels such as email or phone text messaging, which lack context about the game group.

User $U_1$ 501 uses 570 the game-group discussion control 520 to initiate game-group communication from within the game 514A. In some embodiments, the use 570 of the session launch control verifies whether the game mediator 512 and/or the game mediator library 115 are installed on the client device of the user $U_1$ 501, transferring control to the app store 150 if not so that they can be installed.

Control is then transferred 574 to the game mediator 512A, along with any relevant contextual information, such as an identifier of the game being played (that is, the game 514), and an identifier of the in-game group. In one embodiment, the transfer 574 is effected, and the contextual information is provided, via a deep link that references the game mediators. For example, in one embodiment the format of the deep link is <gameMediatorAppName>/chat/<gamegroupID>, where <gameMediatorAppName> indicates, to the operating system of the client device 111 on which the game 514 is installed, the name for launching the game mediator 512, and <gamegroupID> is an ID uniquely identifying the particular game group within the game 514. For instance, the deep link bunch.live/chat/clashroyale indicates that the name of the application for the game mediator 514 is "bunch.live", that chat communication is desired, and that the game being played is Clash Royale™. The game 514 is designed to select the <gamegroupID> for a given game group such that it is different from the <gamegroupIDs> selected for a different group. The <gamegroupID> need not be human-readable, as in the above example, but need merely map uniquely to a particular game group.

The game mediator server 130 accordingly stores 578 the provided contextual information about the gameplay session. In some embodiments, the game mediator server 130 instructs 580 the game mediator 512A of the user 501 to configure an appropriate discussion user interface. Assuming that the in-game group is large (e.g., 50 players), apportioning a separate part of the client device display for each member of the group—as illustrated in FIG. 7 for two users—would be impractical. Accordingly, a different communication mechanism is chosen. For example, in some embodiments a textual chat interface is employed. Such a chat interface can also allow the user to designate a subset of the other users in the chat and spawn a separate lobby interface for that subset. For example, designating four other users from the chat interface and spawning a lobby interface for those users would result in a user interface similar to that of FIG. 7, but for 5 users (that is, the user designating the other users, and the 4 other users).

Other members of the game group wishing to communicate with each other for gameplay would perform actions similar to those of steps 570-598 above. Since the game would provide the same <gamegroupID> to all members of the same in-game group, all would be joined into the same discussion UI (e.g., textual chat UI) and hence could begin immediate interaction with each other.

Advantageously, the use of the game mediation infrastructure allows the creators of the games 114 to focus on development of the core gameplay, delegating many or all details of the establishment of multiplayer game sessions to the game mediation infrastructure. From the perspective of the users of the games, the ability of the game mediation infrastructure to establish multiplayer game sessions reduces or eliminates the user interface actions that would otherwise be required before beginning gameplay, dramatically streamlining gameplay.

In the above description, some actions are performed by the game mediators 512. In embodiments making game mediator libraries 115 available for inclusion within the games 114 themselves, some of these actions may instead be performed by the game mediator libraries 115 included within the games. In some embodiments, whether a given action is performed by the game mediator 512 or the game mediator library 115 varies. For example, in some embodiments the game mediator library 115 can perform actions indicated in FIGS. 5A and 5B as being performed by the game mediator 512, possibly in more lightweight form. For example, the game mediator library 115 could show a user interface for establishing a multiplayer gaming session and inviting participants within the game 514 itself, rather than using a separate user interface of the game mediator 512 for that purpose.

Further, although above description of FIGS. 5A and 5B describe an embodiment in which the game mediator server 130 coordinates the various client devices involved in a multiplayer gaming session, in other embodiments the game mediators 512 and/or game mediator libraries 115 on the various client devices can interact in a peer-to-peer manner, obviating the need for a game mediator server 130.

Figure 5C:
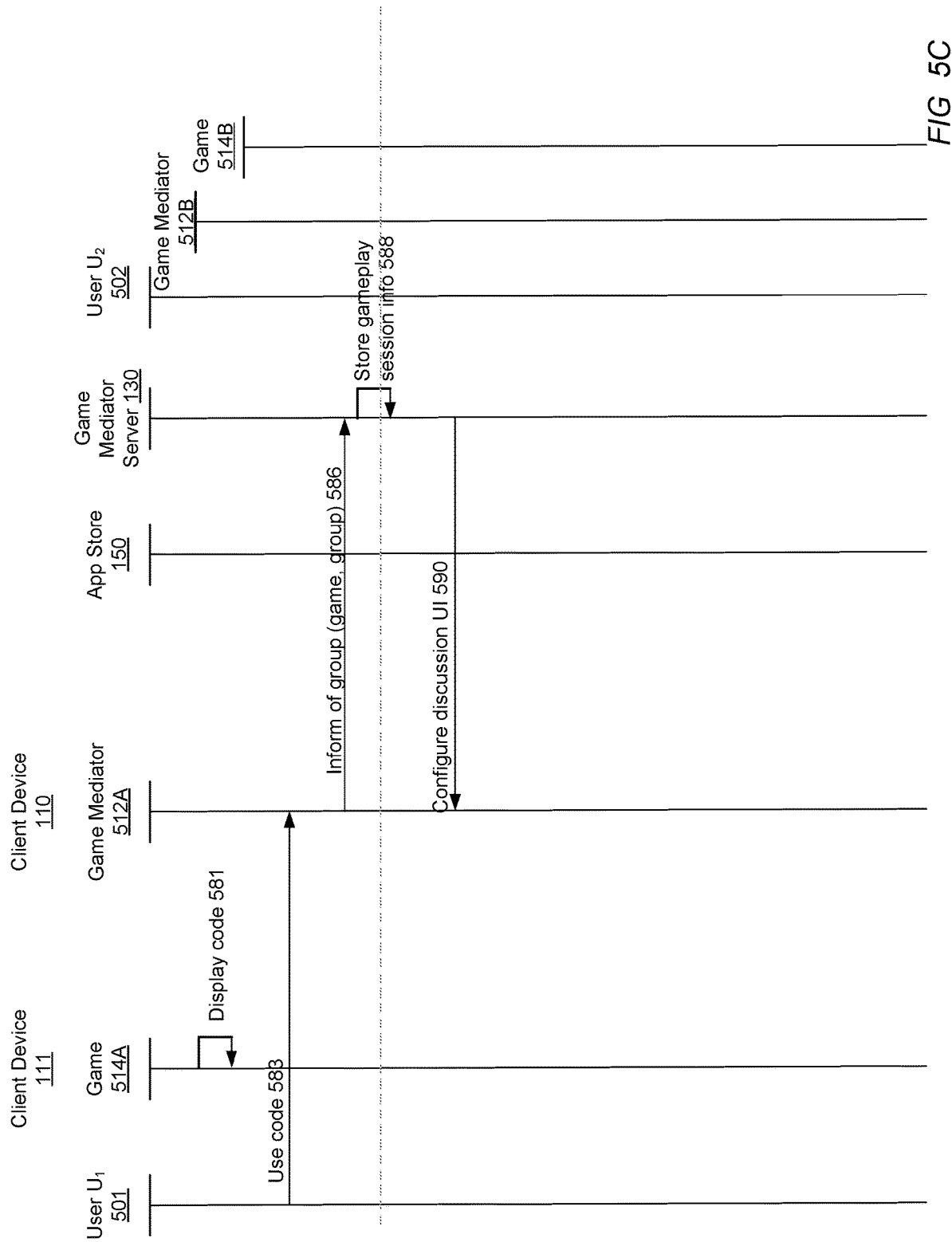
FIG. 5C illustrates the interactions between the various components of the environment of FIG. 1 when establishing and using multiplayer game sessions, according to an embodiment in which the game and the game mediator are executing on different devices.

FIG. 5C illustrates the interactions between the various components of the environment of FIG. 1 when establishing and using multiplayer game sessions, according to an embodiment in which the game 114 and the game mediator are executing on different devices. Specifically, in the example of FIG. 5C, the game 114 executes on client device 111 (e.g., a dedicated game console such as the NINTENDO SWITCH), and the game mediator 112 executes on client device 110 (e.g., a smart phone of the user playing the game 114). In such an environment, the client device 111 (e.g., a game console) provides little or no user interface for establishing and interacting with a game session, and hence the user's separate client device 110 can serve as the user interface for that purpose. It is valuable to simplify the process of associating the client devices 110 and 111 with the same game session.

To achieve this, the game 114 generates and displays a code that identifies the game being played and the gameplay session currently being configured from within the game 114, and the game mediator 512A scans the code to join the session.

Specifically, the user 501 has begun to play the game 514A and go about establishing a gameplay session with other users from within the game. The game 514A generates and displays 581 a code that—as in FIG. 5A—indicates the game being played and the gameplay session being configured. In some embodiments, the code is implemented as a QR code that can be graphically displayed and scanned; in other embodiments, the code is implemented as text (e.g., a numeric PIN). The user 501 then uses 583 the displayed code to cause the game mediator 112 to be joined into the gameplay. For example, in embodiments in which the code is a QR code, the user 501 can use the client device 110 to scan the code; in other embodiments in which the code is text, the user can manually enter the code into a user interface of the client device 110. In some embodiments, the code maps uniquely to a deep link with a format similar to that discussed above with respect to FIG. 5A, such as <gameMediatorAppName>/<roomID>/<gameName>. In any case, the game mediator 112 decodes the various components (e.g., <gameMediatorAppName>, <roomID>, and <gameName>) from the received code. Steps 586, 588, and 590 then proceed in the same manner as those of steps 566, 568, and 570 of FIG. 5A.

Figure 5D:
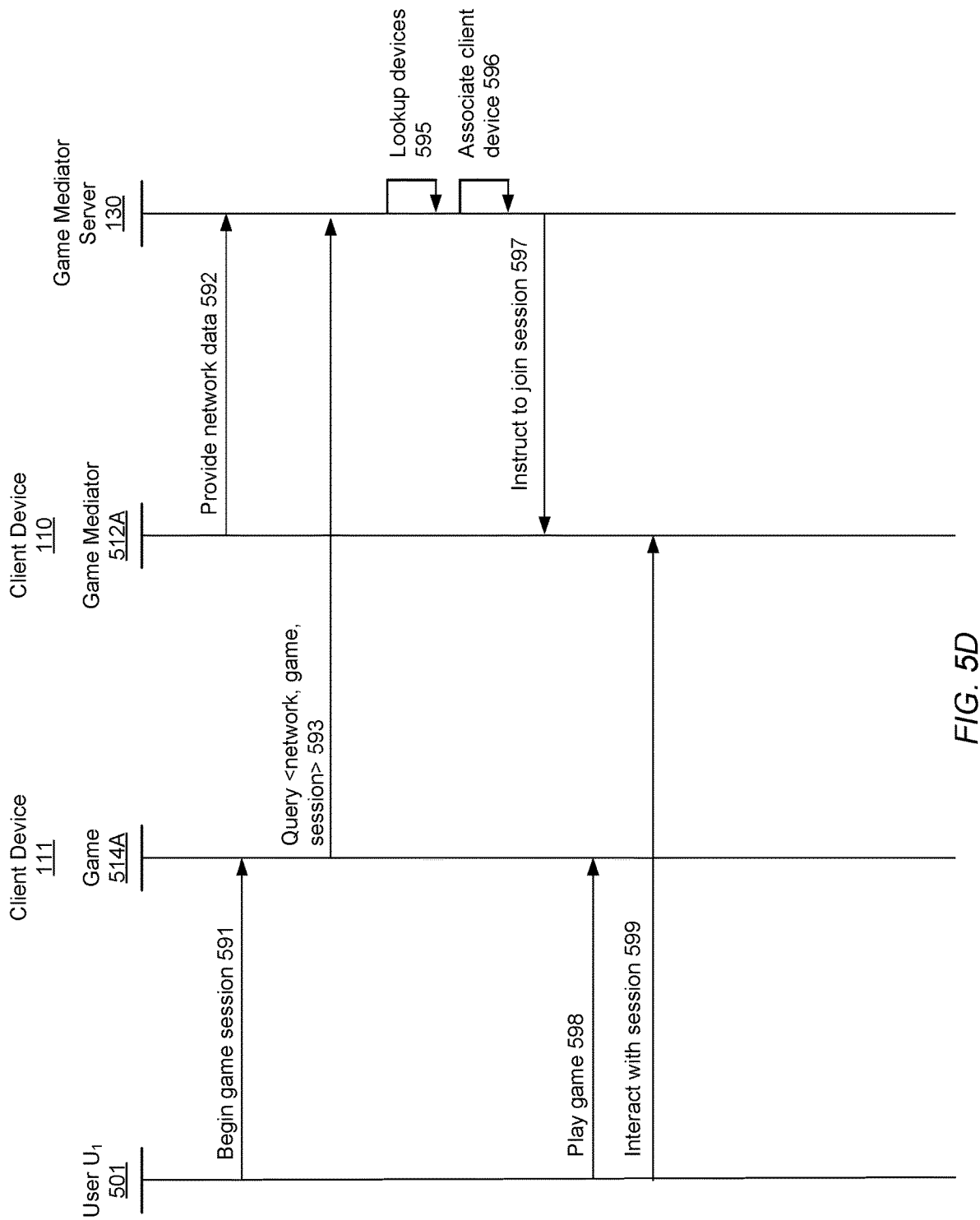
FIG. 5D illustrates the interactions between the various components of the environment of FIG. 1 when establishing and using multiplayer game sessions, according to another embodiment in which the game and the game mediator are executing on different devices.

FIG. 5D illustrates the interactions between the various components of the environment of FIG. 1 when establishing and using multiplayer game sessions, according to another embodiment in which the game 114 and the game mediator 112 are executing on different devices. As with the example of FIG. 5C, in the example of FIG. 5D, the game 114 executes on client device 111 (e.g., a dedicated game console such as the NINTENDO SWITCH), and the game mediator 112 executes on client device 110 (e.g., a smart phone of the user playing the game 114). In the example of FIG. 5D, however, the game mediation infrastructure does not rely on the use of manually or semi-manually shared codes, but instead uses wireless network information to automatically join the client devices 110, 111 within the gameplay session.

Specifically, the user 501 has installed the game mediator 512A on the user's client device 110. The user 501 has also already begun 591 a session in the game 514A with one or more other users, and the game (e.g., via its remote game server) has assigned a unique ID to that gameplay session. At some point, the client device 110 connects to a network (e.g., a Wi-Fi network), and when the game mediator 512A runs (e.g., in response to the game 514A prompting the user to run the game mediator 512A as a communication channel for the game), the game mediator provides 592 the game mediator server 130 with network data about its network connection (e.g., a unique identifier of the Wi-Fi network), as well as its own ID (e.g., a unique hardware identifier of the client device 110), and the game mediator server 130 adds this data to its information about the available devices of users.

At this point, in order to automatically use additional client devices of the user 501—such as the client device 110—for interaction with the gameplay session, the game 514A uses the game mediation infrastructure to query 593 the game mediator server 130 for available devices of the user. The query includes information about the network to which the client device 111 is presently connected (e.g., an identifier of a Wi-Fi network to which the client device is connected), an identifier of the game 514A presently being played, which uniquely identifies the game to the game mediator server 130, and an identifier corresponding to a new session for the game 514A presently being played by the user 501.

In response to the query, the game mediator server 130 looks up 595 client devices previously registered (e.g., as a result of step 592) as being available on the same network. In the example of FIG. 5D, the game mediator server 130 finds an entry for the client device 110, given that the client device 110 it is presently connected to the same Wi-Fi network as the client device 111. The game mediator server 130 associates 596 the client device 111 with the game 514A and with the gameplay session, given that it was the client device 111 that issued the query 1005. The game mediator server 130 also instructs 597 the game mediator 112 on the client device 110 to join the session. In consequence, the user 501 can not only play 598 the game on the client device 111, but also interact 599 with the new session using the game mediator 512A on the client device 110, such as communicating with the other player(s) in the session (if those players also have their own game mediators 112), adding more users to the gaming session using the lobby UI of the game mediator 512A, transferring control back to the game 114, and the like.

In embodiments in which the game 514A incorporates the game mediator library 115, the game mediator server 130 can respond to the query 593 by sending the information about the matching client device 110 (e.g., its hardware ID, the unique ID of the user 501 on the game mediator server 130, etc.) back to the game 514A. The game 514A can then use the game mediator library 115 to save an association between the unique ID of the user in the game 514A and the unique ID of the user in the game mediator server 130). Then in future the game 514A, via the game mediator library 115, can immediately associate the user in the game 514 with the user on the game mediator server 130 and take associated actions, such as automatically launching the game mediator 512A and enabling game communication thereby.

When another player on a different network also wishes to play the game, the process would be similar. That is, the game instance 114 of the client device of the other player would likewise query the game mediator server 130 for other registered devices, as in step 593; the game mediator server 130 would look up other registered devices on the same network as the client device of the other player, and instructing the other registered devices on the same network to join the gameplay session.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. As used herein, the term "module" refers to computer program logic utilized to provide the specified functionality. Thus, a module can be implemented in hardware, firmware, and/or software.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for establishing a group gameplay session of an electronic game, the computer-implemented method comprising:
   receiving, from the electronic game by a game mediator process, a message in a format defined by the game mediator process, the message comprising contextual information including an identifier assigned by the electronic game to correspond to a unique gameplay session of the electronic game, wherein the message is a deep link having a uniform resource locator (URL) with a first portion causing an operating system to transfer control to the game mediator process and a second portion specifying the identifier of the unique gameplay session, and wherein the message is received responsive to a player of the electronic game selecting a user interface control within a user interface of the electronic game, code associated with the user interface control causing:
      sending of the message,
      verifying whether a game mediator, of which the game mediator process is an instance, is installed on a client device on which the code is executing, and
      responsive to failing to verify that the game mediator is installed, transferring control to an application store for installation of the game mediator;
   providing at least some of the contextual information to a remote game mediator server for establishment of the gameplay session; and
   configuring, by the game mediator process, a lobby user interface to reflect the unique gameplay session and the electronic game.

2. The computer-implemented method of claim 1, wherein the lobby user interface visually indicates the electronic game and users currently in the gameplay session.

3. The computer-implemented method of claim 1, wherein the lobby user interface comprises a mechanism to transfer control back to the electronic game.

4. The computer-implemented method of claim 1, wherein the contextual information additionally comprises an identifier of the electronic game, and wherein the lobby user interface includes voice and video chat functionality.

5. The computer-implemented method of claim 1, wherein the electronic game executes on a game client device different from a client device on which the game mediator process executes, and wherein receiving the message comprises the game mediator process obtaining a code displayed by the electronic game on the game client device.

6. The computer-implemented method of claim 5, wherein the code is a QR code, and wherein the game mediator process obtains the code by scanning the QR code.

7. The computer-implemented method of claim 1, further comprising:
   the game mediator process determining a number of players in the gameplay session; and
   the game mediator process selecting a type of communication mechanism for the gameplay session based on the determined number of players.

8. The computer-implemented method of claim 7, wherein the selected type of communication mechanism is a chat interface, the computer-implemented method further comprising:
   receiving a designation from a player in the gameplay session of a subset of the users in the gameplay session; and
   spawning a separate lobby interface for the designated subset of the users.

9. The computer-implemented method of claim 1, further comprising:
   identifying a computer network of a client device on which the electronic game is being executed;
   the electronic game querying a remote game mediator server for other client devices connected to the computer network; and
   game mediator processes on the other client devices joining the gameplay session, responsive to receiving instructions from the remote game mediator server.

10. A non-transitory computer-readable storage medium containing instructions that when executed by a computer processor perform actions comprising:
    receiving, from an electronic game by a game mediator process, a message in a format defined by the game mediator process, the message comprising contextual information including an identifier assigned by the electronic game to correspond to a unique gameplay session of the electronic game, wherein the message is a deep link having a uniform resource locator (URL) with a first portion causing an operating system to transfer control to the game mediator process and a second portion specifying the identifier of the unique gameplay session;
    providing at least some of the contextual information to a remote game mediator server for establishment of the gameplay session;
    configuring, by the game mediator process, a lobby user interface to reflect the unique gameplay session and the electronic game;
    the game mediator process determining a number of players in the gameplay session; and
    the game mediator process selecting a type of communication mechanism for the gameplay session based on the determined number of players.

11. The non-transitory computer-readable storage medium of claim 10, wherein the lobby user interface visually indicates the electronic game and users currently in the gameplay session.

12. The non-transitory computer-readable storage medium of claim 10, wherein the lobby user interface comprises a mechanism to transfer control back to the electronic game.

13. The non-transitory computer-readable storage medium of claim 10, wherein the contextual information additionally comprises an identifier of the electronic game, and wherein the lobby user interface includes voice and video chat functionality.

14. The non-transitory computer-readable storage medium of claim 10, wherein the electronic game executes on a game client device different from a client device on which the game mediator process executes, and wherein receiving the message comprises the game mediator process obtaining a code displayed by the electronic game on the game client device.

15. The non-transitory computer-readable storage medium of claim 14, wherein the code is a QR code, and wherein the game mediator process obtains the code by scanning the QR code.

16. A non-transitory computer-readable storage medium containing instructions that when executed by the computer processor perform actions comprising:
    receiving, from an electronic game by a game mediator process, a message in a format defined by the game mediator process, the message comprising contextual information including an identifier assigned by the electronic game to correspond to a unique gameplay session of the electronic game, wherein the message is a deep link having a uniform resource locator (URL) with a first portion causing an operating system to transfer control to the game mediator process and a second portion specifying the identifier of the unique gameplay session;

providing at least some of the contextual information to a remote game mediator server for establishment of the gameplay session;

configuring, by the game mediator process, a lobby user interface to reflect the unique gameplay session and the electronic game;

identifying a computer network of a client device on which the electronic game is being executed;

the electronic game querying a remote game mediator server for other client devices connected to the computer network; and game mediator processes on the other client devices joining the gameplay session, responsive to receiving instructions from the remote game mediator server.

17. The non-transitory computer-readable storage medium of claim 16, wherein the contextual information additionally comprises an identifier of the electronic game, and wherein the lobby user interface includes voice and video chat functionality.

18. The non-transitory computer-readable storage medium of claim 16, wherein the electronic game executes on a game client device different from a client device on which the game mediator process executes, and wherein receiving the message comprises the game mediator process obtaining a code displayed by the electronic game on the game client device.

19. A non-transitory computer-readable storage medium storing instructions that when executed by a computer processor perform actions comprising:

receiving, from an electronic game by a game mediator process, a message in a format defined by the game mediator process, the message comprising contextual information including an identifier assigned by the electronic game to correspond to a unique gameplay session of the electronic game, wherein the message is a deep link having a uniform resource locator (URL) with a first portion causing an operating system to transfer control to the game mediator process and a second portion specifying the identifier of the unique gameplay session, and wherein the message is received responsive to a player of the electronic game selecting a user interface control within a user interface of the electronic game, code associated with the user interface control causing:
sending of the message,
verifying whether a game mediator, of which the game mediator process is an instance, is installed on a client device on which the code is executing, and
responsive to failing to verify that the game mediator is installed, transferring control to an application store for installation of the game mediator;

providing at least some of the contextual information to a remote game mediator server for establishment of the gameplay session; and configuring, by the game mediator process, a lobby user interface to reflect the unique gameplay session and the electronic game.

20. A computer-implemented method comprising:

receiving, from an electronic game by a game mediator process, a message in a format defined by the game mediator process, the message comprising contextual information including an identifier assigned by the electronic game to correspond to a unique gameplay session of the electronic game, wherein the message is a deep link having a uniform resource locator (URL) with a first portion causing an operating system to transfer control to the game mediator process and a second portion specifying the identifier of the unique gameplay session;

providing at least some of the contextual information to a remote game mediator server for establishment of the gameplay session;

configuring, by the game mediator process, a lobby user interface to reflect the unique gameplay session and the electronic game;

the game mediator process determining a number of players in the gameplay session; and the game mediator process selecting a type of communication mechanism for the gameplay session based on the determined number of players.

21. The computer-implemented method of claim 20, wherein the message is received responsive to a player of the electronic game selecting a user interface control within a user interface of the electronic game, code associated with the user interface control causing sending of the message.

22. The computer-implemented method of claim 21, wherein the code associated with the user interface control additionally:

verifies whether a game mediator, of which the game mediator process is an instance, is installed on a client device on which the code is executing; and responsive to failing to verify that the game mediator is installed, transfers control to an application store for installation of the game mediator.

23. A computer-implemented method comprising:

receiving, from an electronic game by a game mediator process, a message in a format defined by the game mediator process, the message comprising contextual information including an identifier assigned by the electronic game to correspond to a unique gameplay session of the electronic game, wherein the message is a deep link having a uniform resource locator (URL) with a first portion causing an operating system to transfer control to the game mediator process and a second portion specifying the identifier of the unique gameplay session;

providing at least some of the contextual information to a remote game mediator server for establishment of the gameplay session;

configuring, by the game mediator process, a lobby user interface to reflect the unique gameplay session and the electronic game;

identifying a computer network of a client device on which the electronic game is being executed;

the electronic game querying a remote game mediator server for other client devices connected to the computer network; and game mediator processes on the other client devices joining the gameplay session, responsive to receiving instructions from the remote game mediator server.

* * * * *